US012489472B2

(12) United States Patent
Chen et al.

(10) Patent No.: US 12,489,472 B2
(45) Date of Patent: Dec. 2, 2025

(54) MULTIPLE TRANSCEIVER COOLING SYSTEM

(71) Applicant: Dell Products L.P., Round Rock, TX (US)

(72) Inventors: Yen-Chih Chen, New Taipei (TW); Shih-Huai Cho, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 424 days.

(21) Appl. No.: 17/994,724

(22) Filed: Nov. 28, 2022

(65) Prior Publication Data

US 2024/0178867 A1 May 30, 2024

(51) Int. Cl.
*H04B 1/036* (2006.01)
*H04B 1/38* (2015.01)
*H05K 7/20* (2006.01)

(52) U.S. Cl.
CPC ............... *H04B 1/036* (2013.01); *H04B 1/38* (2013.01); *H05K 7/2039* (2013.01)

(58) Field of Classification Search
CPC . H04B 1/036; H04B 1/38; H04B 1/08; H04B 1/088; H04B 1/03; H05K 7/2039; H05K 7/20336; H05K 7/203
See application file for complete search history.

(56) References Cited

U.S. PATENT DOCUMENTS

| 11,310,940 B2* | 4/2022 | Moon ..................... H04B 1/38 |
| 2013/0279115 A1* | 10/2013 | Blumenthal ....... H05K 7/20336 |
| 2013/0294032 A1* | 11/2013 | Stella ..................... H05K 7/203 |
| 2015/0013936 A1* | 1/2015 | Mack ..................... H04B 10/40 |
| 2015/0083371 A1* | 3/2015 | Hsieh ..................... H04B 1/036 |
| 2018/0376617 A1* | 12/2018 | Chen ................. H05K 7/20336 |
| 2020/0304889 A1* | 9/2020 | Weltsch ............... H05K 7/2039 |
| 2021/0359712 A1* | 11/2021 | Rathinasamy ......... H04B 1/036 |
| 2022/0394874 A1* | 12/2022 | Masuda ............. H05K 7/20336 |
| 2024/0124758 A1* | 4/2024 | Tobata ................ H05K 7/2039 |

FOREIGN PATENT DOCUMENTS

JP 2004104910 A * 4/2004

* cited by examiner

*Primary Examiner* — Lana N Le
(74) *Attorney, Agent, or Firm* — Joseph Mencher

(57) ABSTRACT

A multiple transceiver cooling system includes a networking device, a plurality of transceiver device chassis that are included in the networking device, that are positioned adjacent each other, and that are each configured to receive a respective transceiver device, and a multiple transceiver heat dissipation device that engages each of the plurality of transceiver device chassis. With the multiple transceiver heat dissipation device engaging each of the plurality of transceiver device chassis, the multiple transceiver heat dissipation device may receive heat generated by respective transceiver devices located in the plurality of transceiver device chassis, transfer the heat to a heat dissipation element, and dissipate the heat using the heat dissipation element.

20 Claims, 20 Drawing Sheets

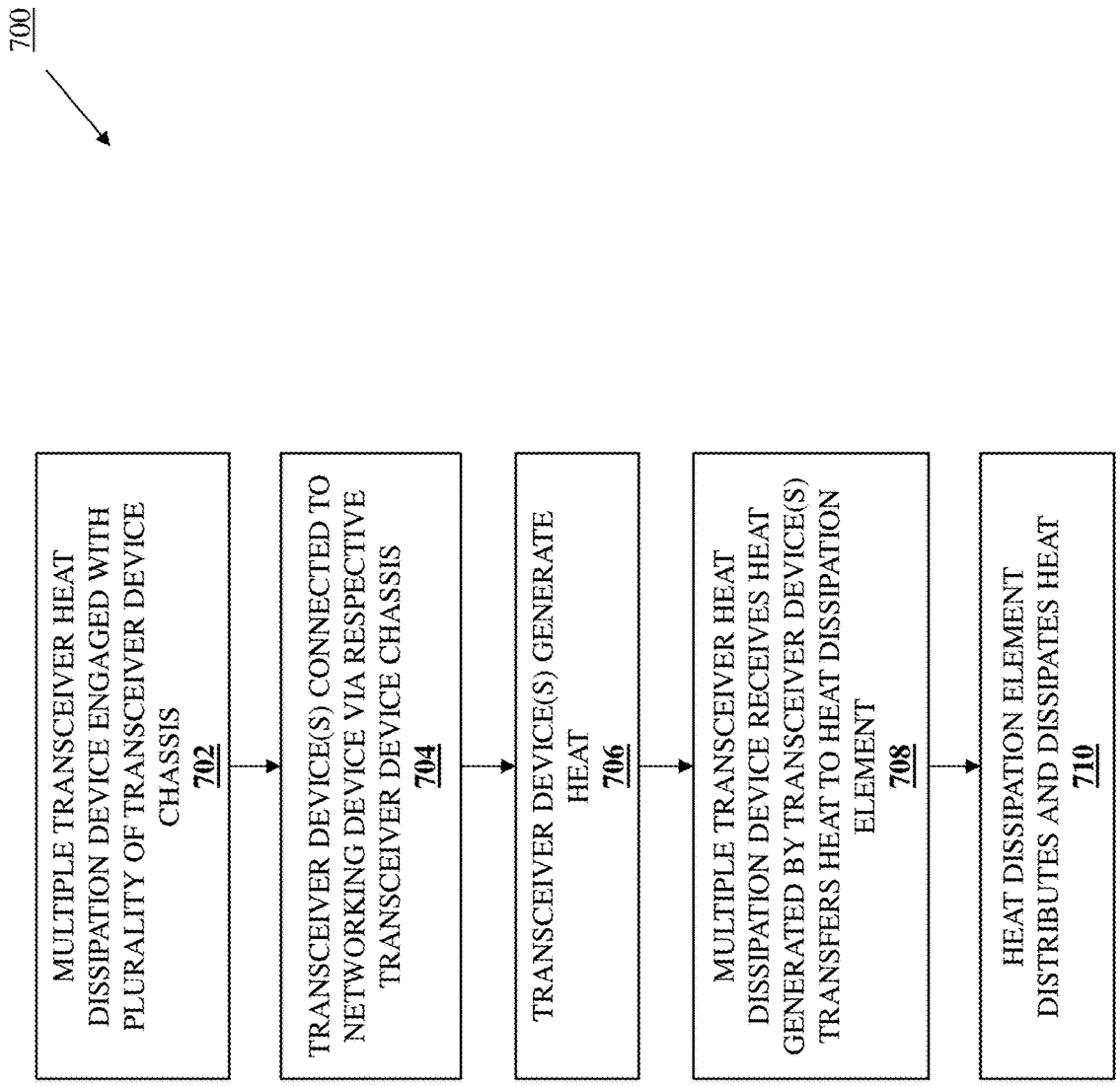

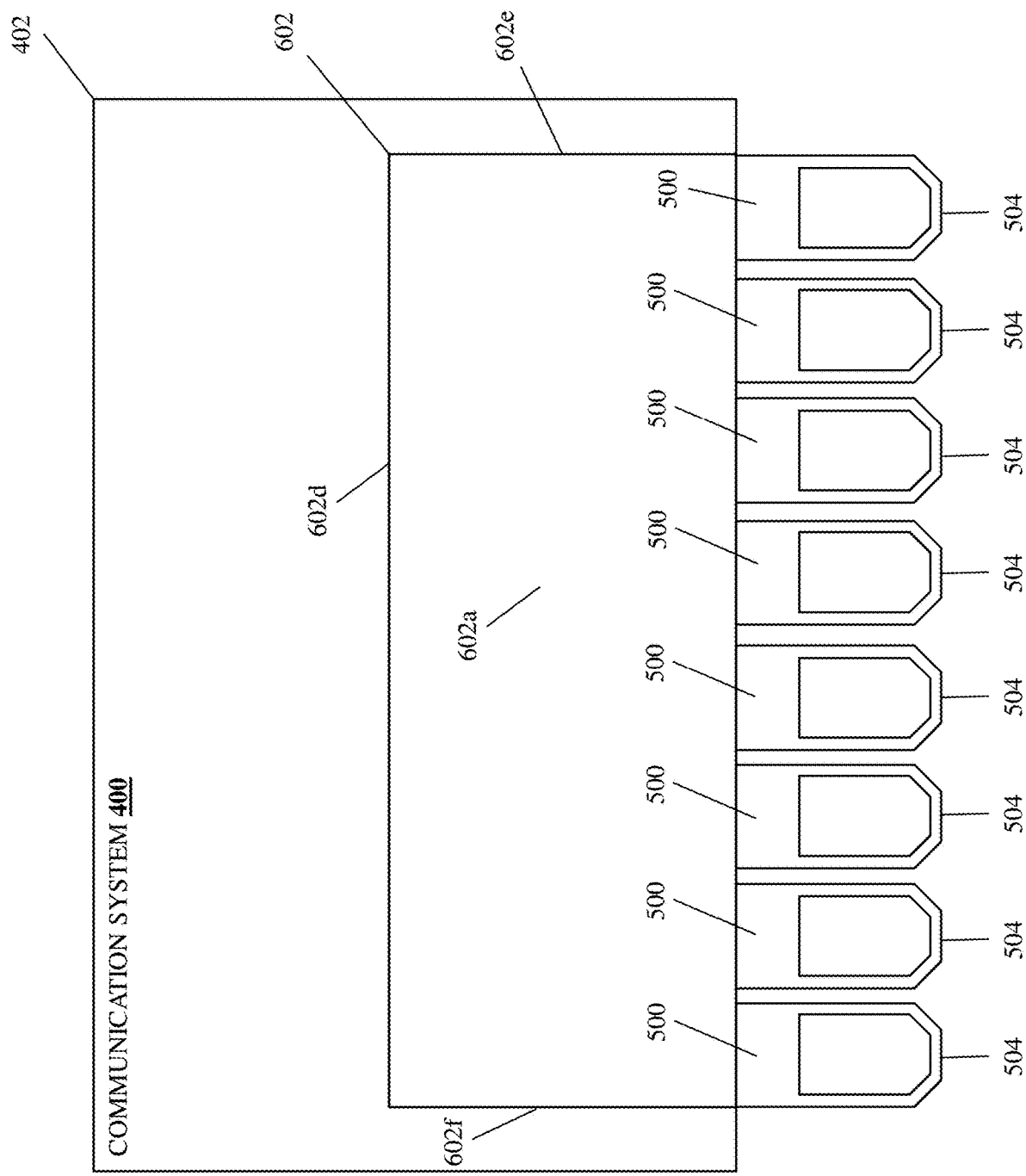

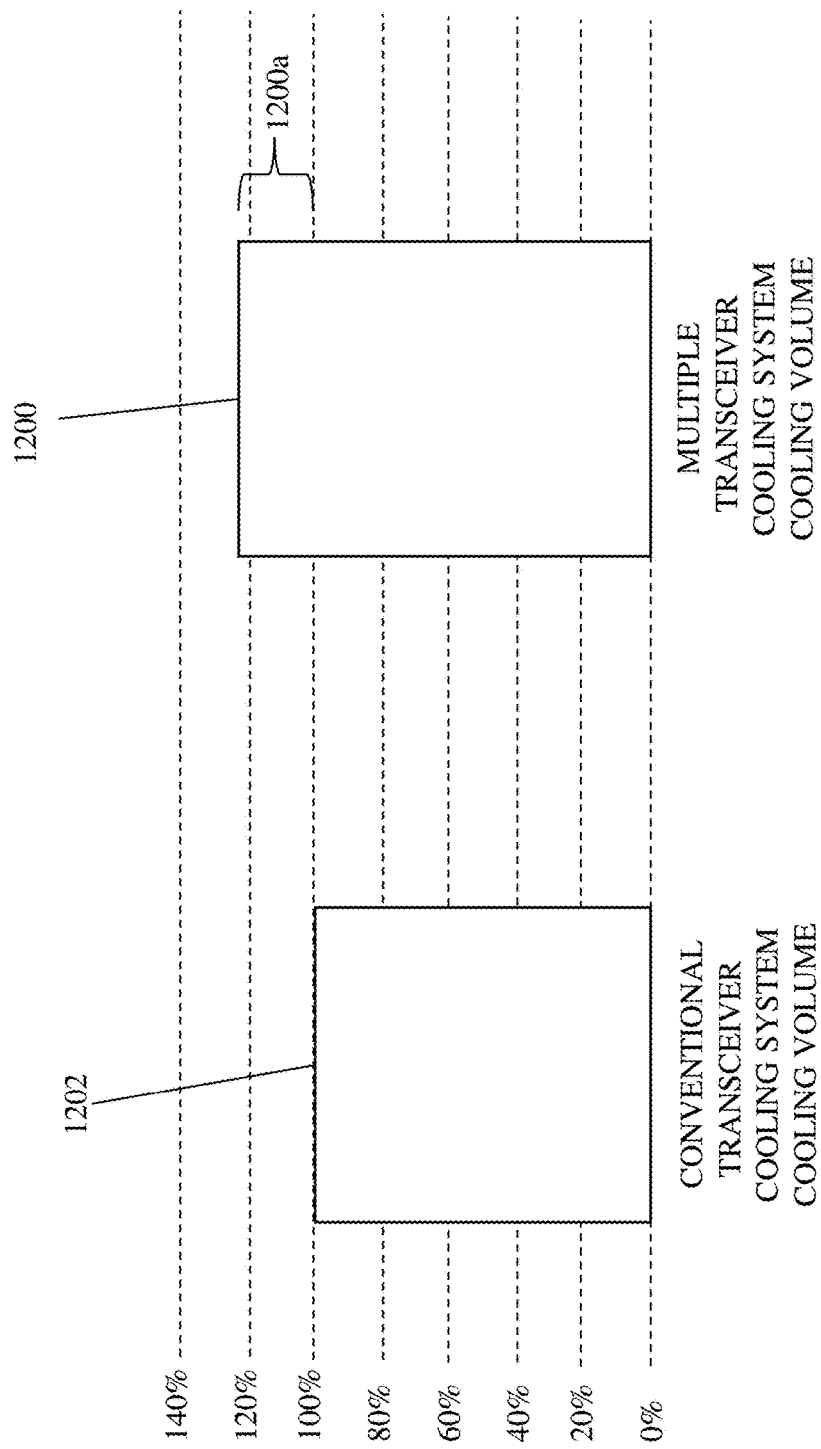

MULTIPLE TRANSCEIVER COOLING SYSTEM

BACKGROUND

The present disclosure relates generally to information handling systems, and more particularly to cooling transceiver devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, router devices, and/or other networking devices known in the art sometimes utilize transceiver devices to transmit data between computing devices in a networked system. For example, high-power optical transceiver devices (e.g., 400G QSFP56-DD transceiver devices) may be coupled to switch devices in order to provide for the conversion between electrical signals and optical signals for use in electrical/fiber optic networked systems. In some situations, transceiver devices may be configured in the networking device in close proximity, and the operation of transceiver modules in close proximity can raise issues.

As will be appreciated by one of skill in the art in possession of the present disclosure, the transmission of data by transceiver devices in a networking device may cause the transceiver devices to generate relatively significant amounts of heat that requires dissipation. Conventional solutions to dissipate the heat generated by a transceiver device include providing a dedicated heat dissipation device (e.g., a heat source riding heat sink kit (HSK) that couples to that transceiver device) that operates to dissipate the heat generated by that transceiver device. However, situations may arise where the heat generated by a transceiver device exceeds the ability of its dedicated heat dissipation device to effectively dissipate the heat. For example, individual transceiver devices such as the high-power optical transceiver devices discussed above can generate heat greater than 10 watts and up to 25 watts that can exceed the effective dissipation capabilities of their dedicated heat dissipation devices, and such issues may be exacerbated when a plurality of the transceiver devices are configured in the networking device in close proximity.

Accordingly, it would be desirable to provide a transceiver cooling system that addresses the issues discussed above.

SUMMARY

According to one embodiment, an Information Handling System (IHS) includes a processing system; a memory system that is coupled to the processing system and that includes instructions that, when executed by the processing system, cause the processing system to provide a networking engine that is configured to perform networking functionality; a plurality of transceiver devices that are coupled to the processing system; and a multiple transceiver heat dissipation device that is thermally coupled to each of the plurality of transceiver devices and that is configured to: receive heat generated by each of the plurality of transceiver devices; transfer the heat to a heat dissipation element that is included on the multiple transceiver heat dissipation device; and dissipate, using the heat dissipation element, the heat.

BRIEF DESCRIPTION OF THE DRAWINGS

FIG. 7 is a flow chart illustrating an embodiment of a method for cooling transceiver devices.

FIG. 9D is a schematic top view illustrating an embodiment of a plurality of the transceiver devices of FIG. 5 coupled to the multiple transceiver cooling system of FIG. 9B during the method of FIG. 7.

FIG. 12 is a graph view illustrating an embodiment of the benefits of the multiple transceiver cooling system of FIGS. 10A-10C relative to the conventional transceiver device cooling system of FIGS. 8A and 8B.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
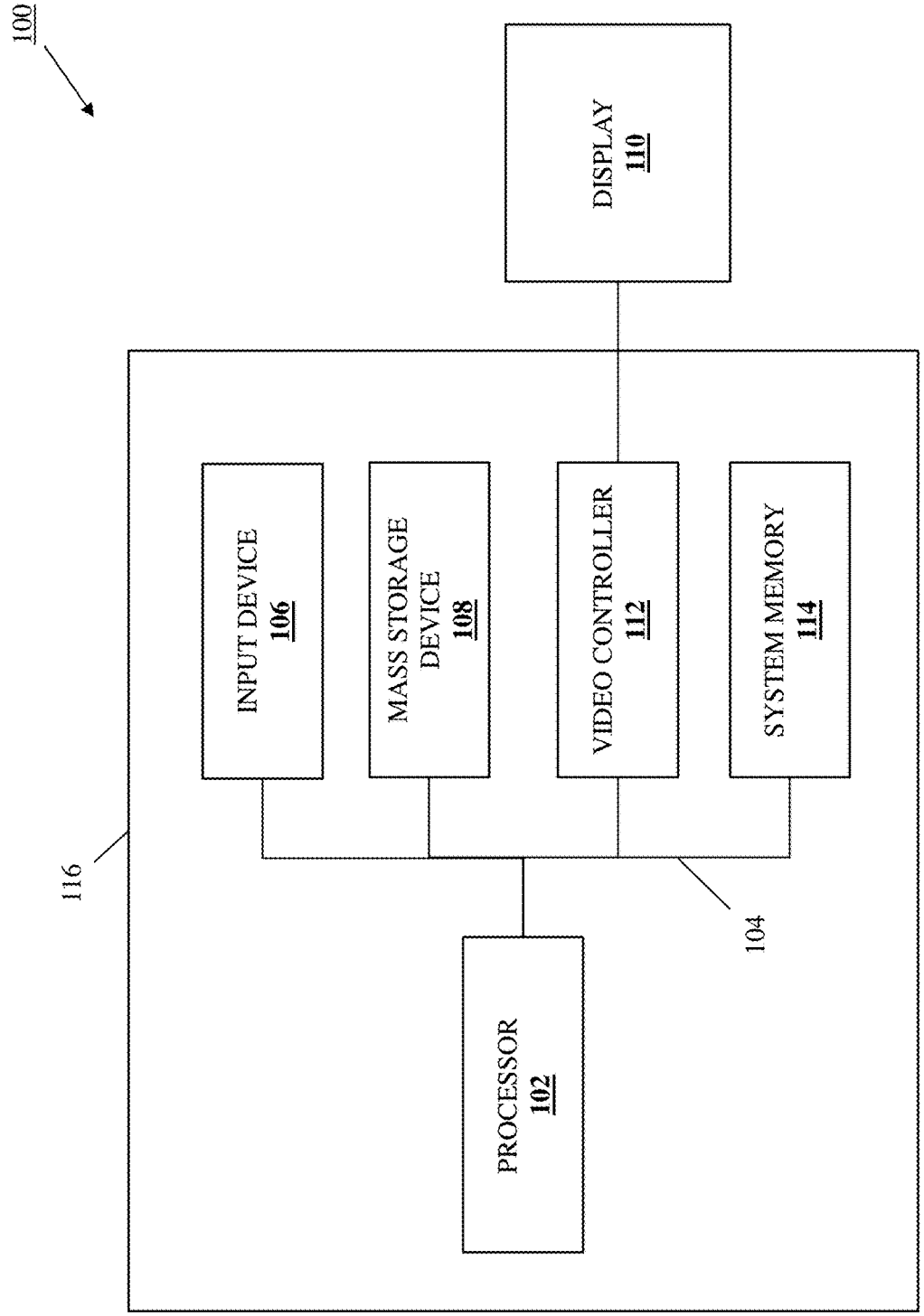
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a user interface 110, which is coupled to processor 102 by a management controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
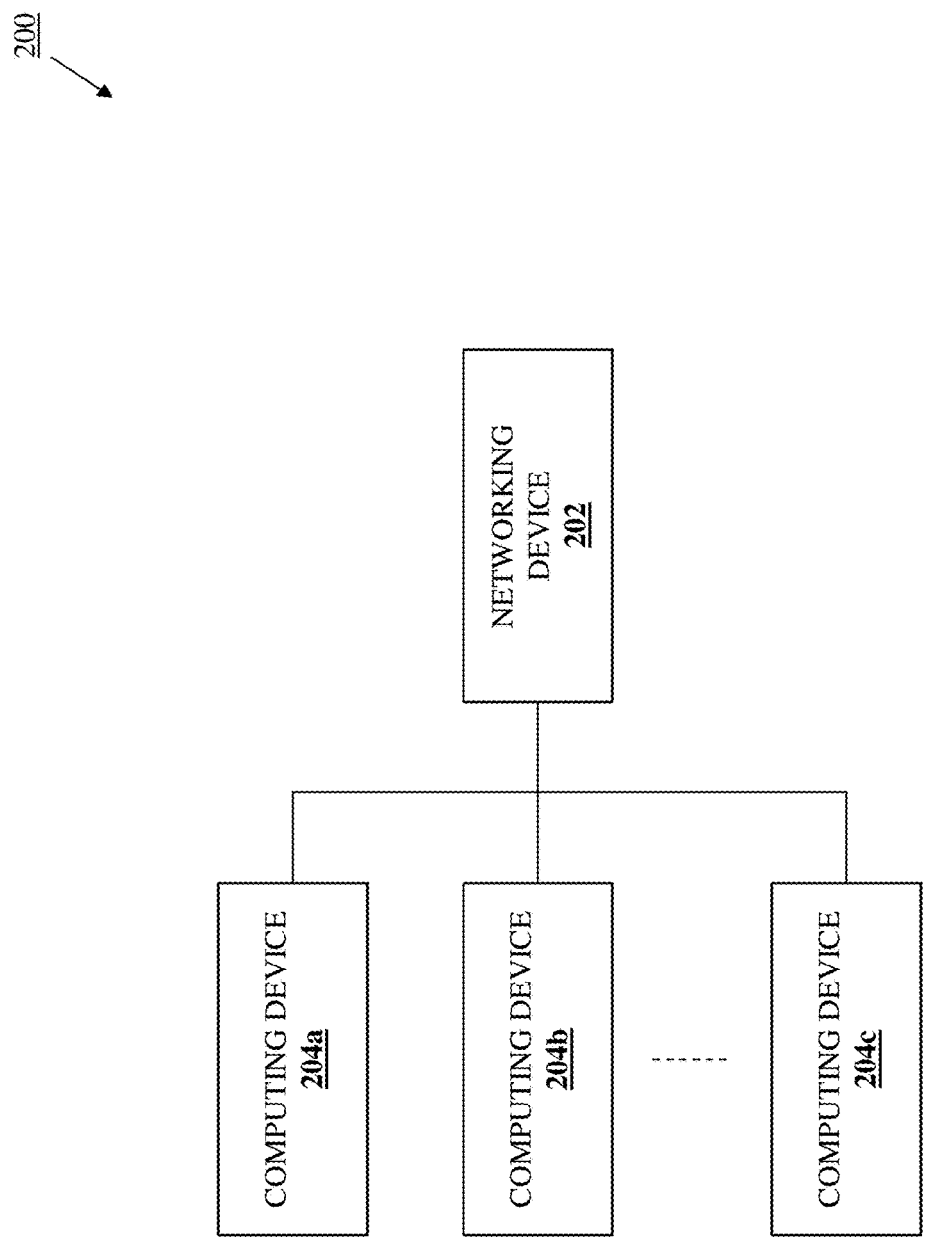
FIG. 2 is a schematic view illustrating an embodiment of a networked system.

Referring now to FIG. 2, an embodiment of a networked system 200 is illustrated that may include the multiple transceiver cooling system of the present disclosure. In the illustrated embodiment, the networked system 200 includes a networking device 202 that is coupled to one or more computing devices 204a, 204b, and up to 204c. In an embodiment, the networking device 202 may be provided by the IHS 100 discussed above with reference to FIG. 1, and/or may include some or all of the components of the IHS 100, and in specific examples may be provided by a switch device. However, while illustrated and discussed as being provided by a switch device, one of skill in the art in possession of the present disclosure will recognize that networking devices provided in the networked system 200 may include a variety of other devices (e.g., router devices, etc.) that may operate similarly as the networking devices discussed below while remaining within the scope of the present disclosure as well.

In an embodiment, the computing devices 204a-204c may be provided by the IHS 100 discussed above with reference to FIG. 1, and/or may include some or all of the components of the IHS 100, and in specific examples may be provided by a server devices, storage systems, networking devices, and/or other computing devices that would be apparent to one of skill in the art in possession of the present disclosure. However, while illustrated and discussed as being provided by particular computing devices, one of skill in the art in possession of the present disclosure will recognize that computing devices provided in the networked system 200 may include a variety of other devices that may operate similarly as the computing devices discussed below while remaining within the scope of the present disclosure as well. Furthermore, while a specific networked system 200 has been illustrated and described, one of skill in the art in possession of the present disclosure will appreciate that the multiple transceiver cooling system of the present disclosure may be provided with other systems and/or devices while remaining within the scope of the present disclosure.

Figure 3:
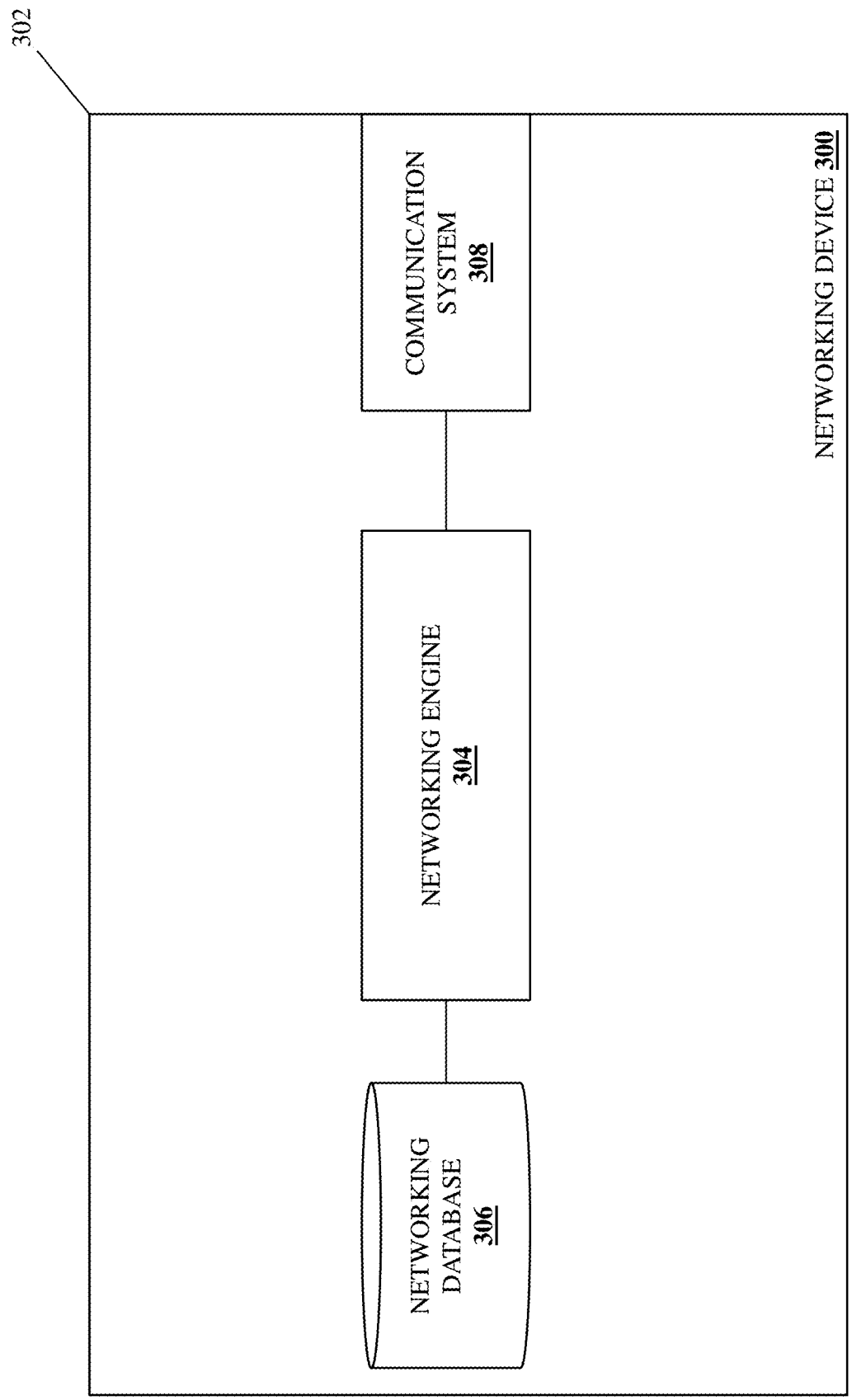
FIG. 3 is a schematic view illustrating an embodiment of a networking device that may be included in the networked system of FIG. 2.

Referring now to FIG. 3, an embodiment of a networking device 300 is illustrated that may provide the networking device 202 discussed above with reference to FIG. 2. As such, the networking device 300 may be provided by the IHS 100 discussed above with reference to FIG. 1 and/or may include some or all of the components of the IHS 100, and in specific examples may be provided by a switch device. Furthermore, while illustrated and discussed as being provided by a switch device, one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that houses the components of the networking device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a networking engine 304 that is configured to perform the functionality of the networking engines and/or networking devices discussed below.

The chassis 302 may also house a storage system (not illustrated, but which may include the storage device 108 discussed above with reference to FIG. 1) that is coupled to the networking engine 304 (e.g., via a coupling between the storage system and the processing system) and that includes a networking database 306 that is configured to store any of the information utilized by the networking engine 304 discussed below. The chassis 302 may also house a communication system 308 that is coupled to the networking engine 304 (e.g., via a coupling between the communication system 308 and the processing system) and that may be provided by a Network Interface Controller (NIC) and/or any of a variety of other networking communication components that would be apparent to one of skill in the art in possession of the present disclosure. However, while a specific networking device 300 has been illustrated and described, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
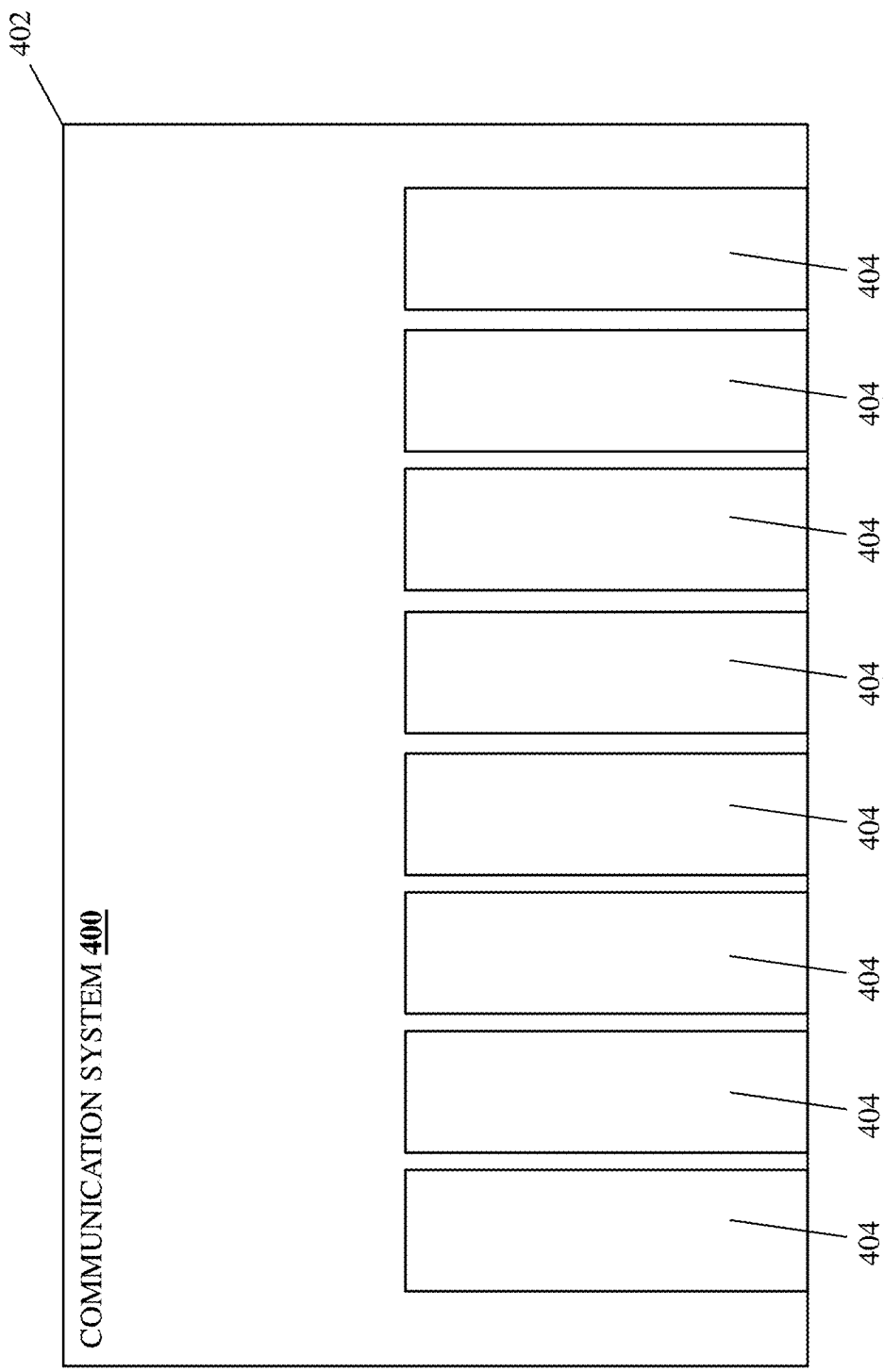
FIG. 4 is a schematic top view illustrating an embodiment of a communication system that may be included in the networking device of FIG. 3.

Now referring to FIG. 4, an embodiment of a communication system 400 is illustrated that may provide the communication system 308 in the networking device 300 of FIG. 3. In the illustrated embodiment, the communication system 400 includes a board 402 that may support the components of the communication system 400, only some of which are illustrated and discussed below. For example, the board 402 may be provided by any of a variety of circuit boards that one of skill in the art in possession of the present disclosure would recognize as being configured to support the components of the communication system 400. While not illustrated, one of skill in the art in possession of the present disclosure will appreciate how the board 402 may include or be coupled to processing systems (e.g., the processing system that provides the networking engine 304 in the networking device 300), memory systems (e.g., the memory system that provides the networking engine 304 in the networking device 300), and/or other components known in the art.

In the illustrated embodiment, a plurality of transceiver device chassis 404 are mounted to the board 402 and, as discussed below, are configured to receive respective transceiver devices in order to allow data to be transmitted between a networking device (e.g., the networking device 300) and other computing devices (e.g., the computing devices 204a-204c in the networked system 200 of FIG. 2). In a specific example, the plurality of transceiver device chassis 404 may be provided by transceiver devices "cages" that are configured to connect and secure any variety of transceiver devices (e.g., optical transceiver devices, Radio Frequency (RF) transceiver devices, Ethernet transceiver devices, wireless transceiver devices, and/or other transceiver devices that would be apparent to one of skill in the art in possession of the present disclosure) to the communication system 400 and the networking device (e.g., the networking engine 304 in the networking device 202/300). Furthermore, while not illustrated, one of skill in the art in possession of the present disclosure will appreciate how the board 402 may include communicative coupling subsystems (e.g., electrical connectors, board traces, etc.) for communicatively coupling transceiver devices that are positioned in the transceiver device chassis 404 to the components included on or coupled to the board 402 (e.g., the processing system and memory system discussed above) in order to allow data transmissions and/or other communications between them. However, while a specific structure has been illustrated and described for connecting and securing transceiver devices to a networking device, one of skill in the art in possession of the present disclosure will recognize that other structures or techniques for connecting and securing transceiver devices to a networking device will fall within the scope of the present disclosure as well.

Figure 5:
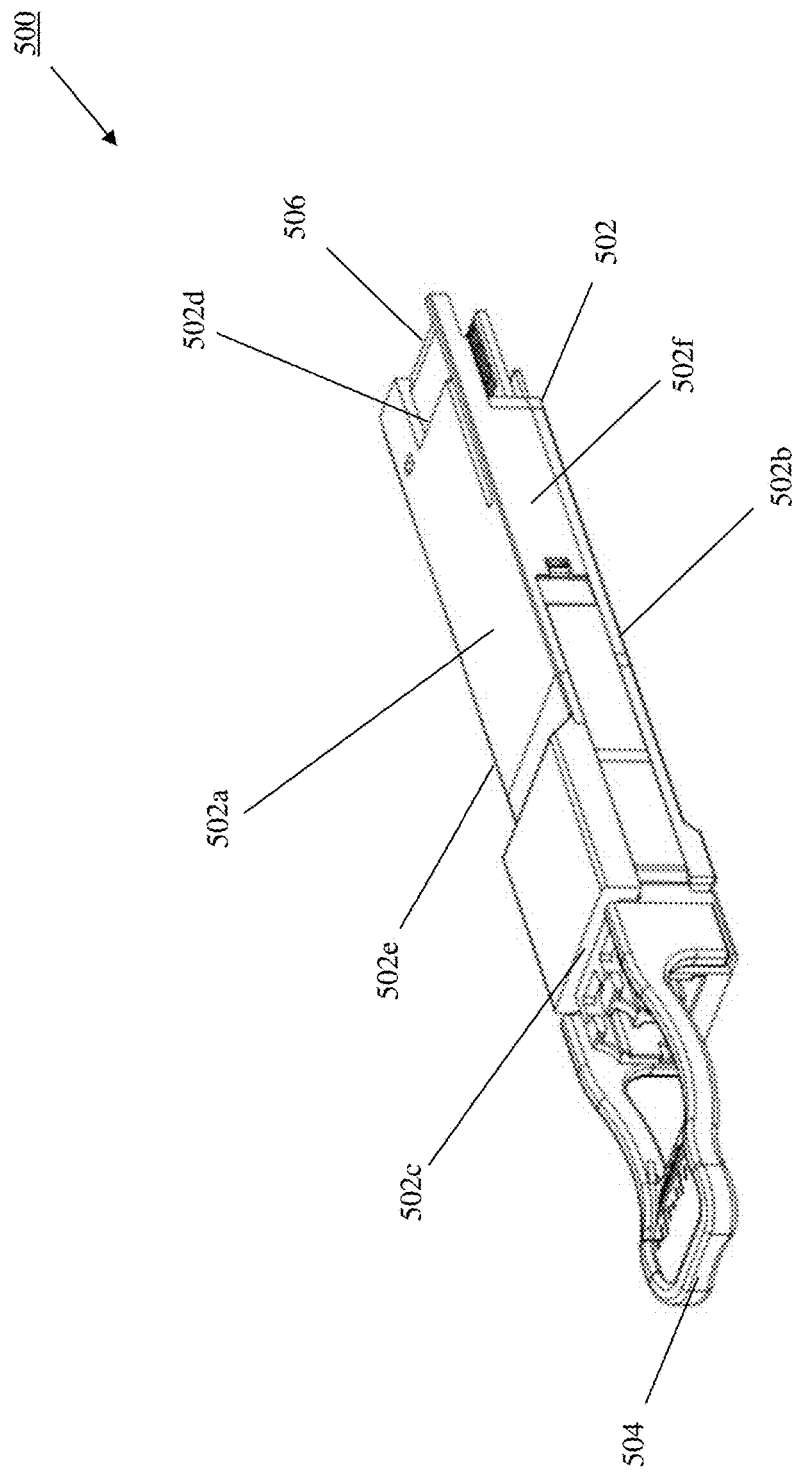
FIG. 5 is perspective view illustrating an embodiment of a transceiver device that may be utilized with the communication system of FIG. 4 and that may be cooled using the multiple transceiver cooling system of the present disclosure.

Now referring to FIG. 5, an embodiment of a transceiver device 500 is illustrated that may be used with the communication system 400 and transceiver device chassis 404 of FIG. 4 (e.g., in networking device 202/300 discussed above). In an embodiment, the transceiver device 500 may be provided by the IHS 100 discussed above with reference to FIG. 1 and/or may include some or all of the components of the IHS 100, and in specific examples may be provided by a relatively high speed (e.g., 400G) Quad Small Form-factor Pluggable Dual-Density (QSFP-DD) optical transceiver device, although other types of transceiver devices will fall within the scope of the present disclosure as well. In the illustrated embodiment, the transceiver device 500 includes a transceiver 502 having a top surface 502a, a bottom surface 502b that is located opposite the transceiver base 502 from the top surface 502a, a front surface 502c that extends between the top surface 502a and the bottom surface 502b, a rear surface 502d that is located opposite the transceiver base 502 from the front surface 502c and that extends between the top surface 502a and the bottom surface 50b, and a pair of opposing side surfaces 502e and 502f that are located opposite the transceiver base 502 from each other and that extend between the top surface 502a, the bottom surface 502b, the front surface 502c, and the rear surface 502d.

In the illustrated embodiment, a transceiver device handle 504 extends from the front surface 502c of the transceiver base 502 and is configured to be grasped by a user to connect and disconnect the transceiver device 500 from the networking device discussed herein. While not illustrated, one of skill in the art in possession of the present disclosure will appreciate how the transceiver device handle 504 and/or transceiver device 500 may include "pull tags" and/or other securing/unsecuring mechanisms to allow the transceiver devices 500 to be secured to and unsecured from the networking device discussed herein. In the illustrated embodiment, a transceiver device connector 506 extends from the rear surface 502d of the transceiver base 502, and is configured to engage a networking device connector in a transceiver port (e.g., provided by the communicative coupling subsystems on the communication system 308/400 included in the networking device described herein). However, while the transceiver device 500 is illustrated in FIG. 5 as being provided by a particular type of transceiver device having particular components and features, one of skill in the art in possession of the present disclosure will appreciate how other types of transceiver devices may be used with the multiple transceiver cooling systems of the present disclosure while remaining within its scope.

Figure 6A:
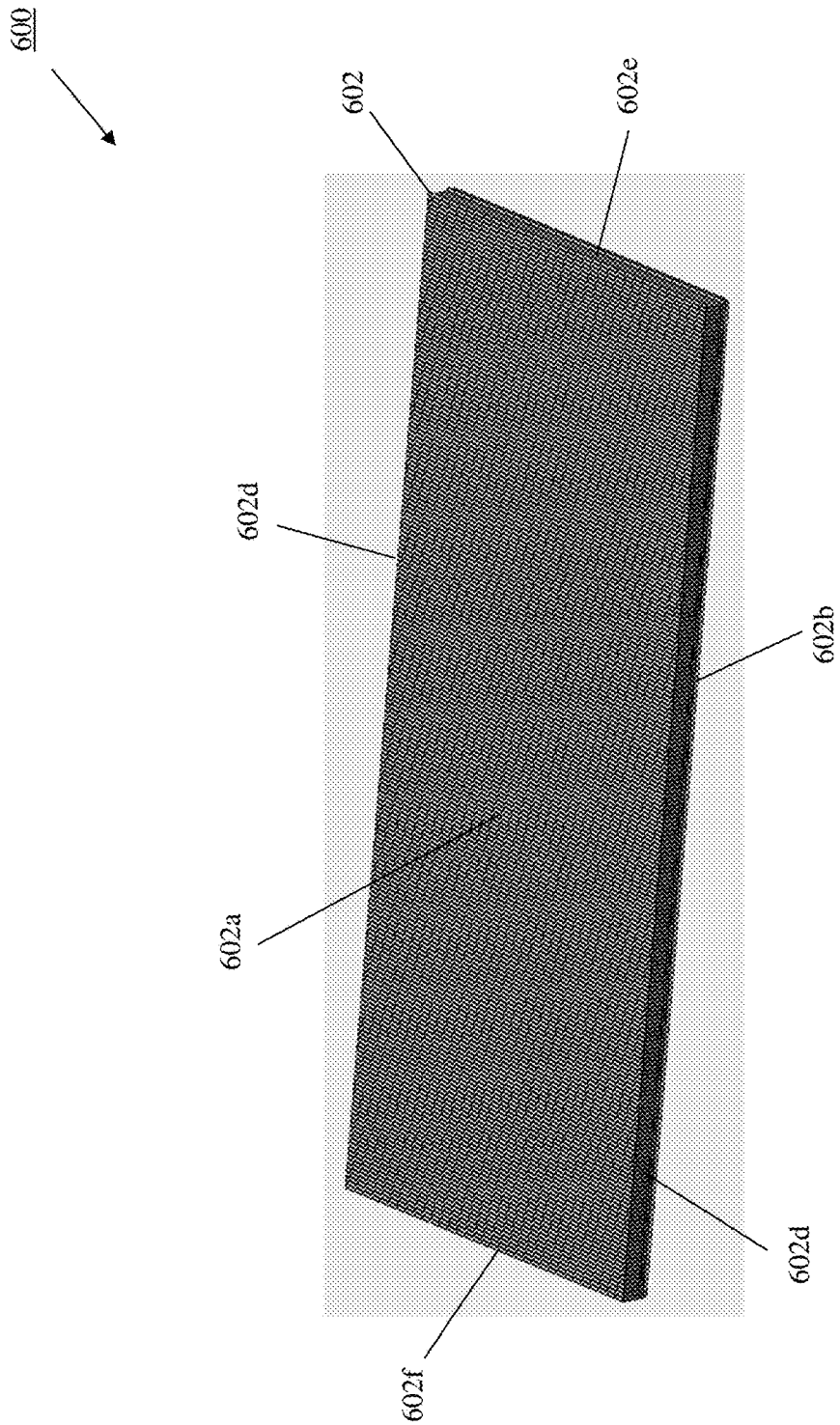
FIG. 6A is a perspective top view illustrating an embodiment of a multiple transceiver heat dissipation device that may be provided according to the teaching of the present disclosure to cool the transceiver device of FIG. 5.
Figure 6B:
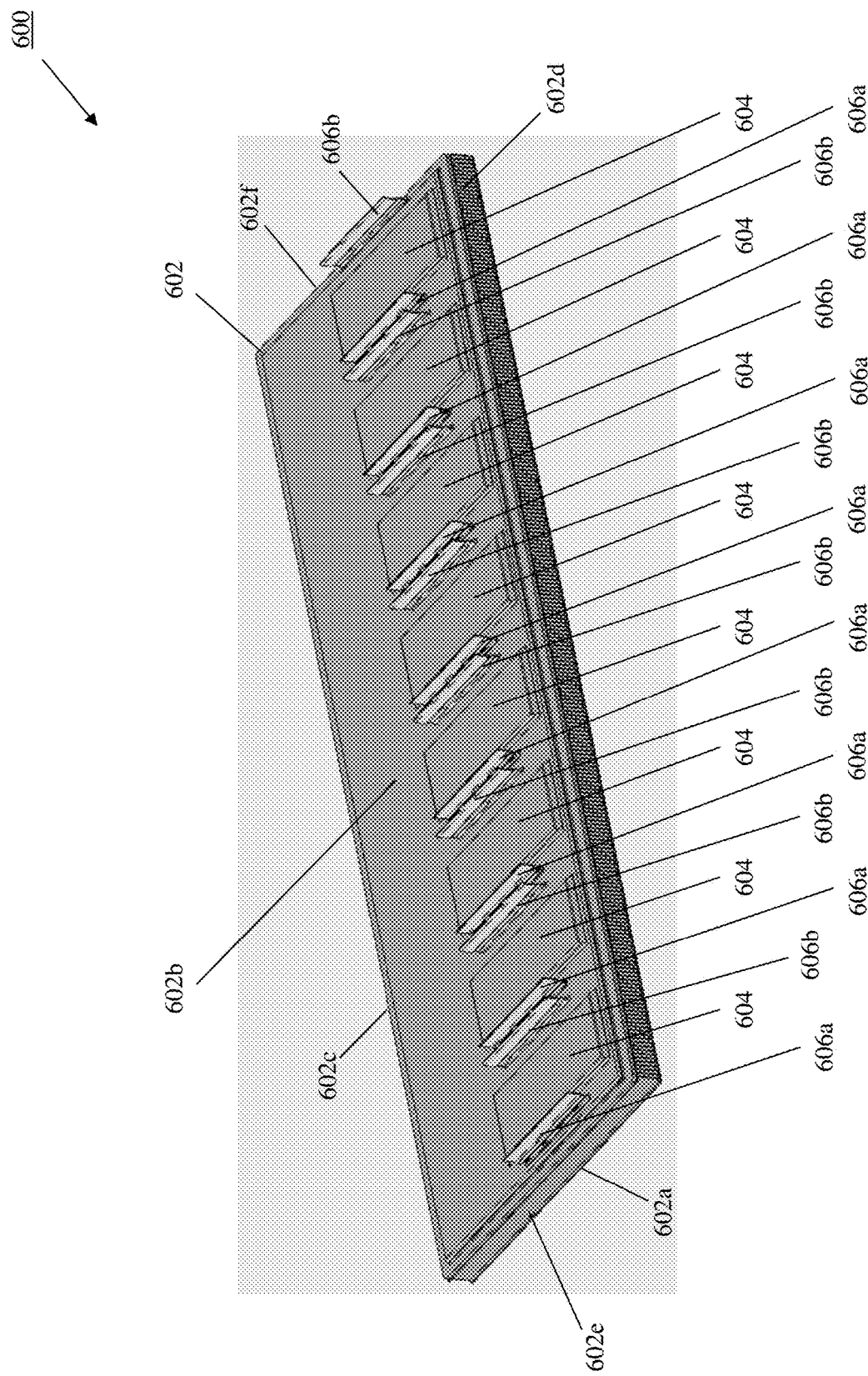
FIG. 6B is a perspective bottom view illustrating an embodiment of the multiple transceiver heat dissipation device of FIG. 6A.
Figure 6C:
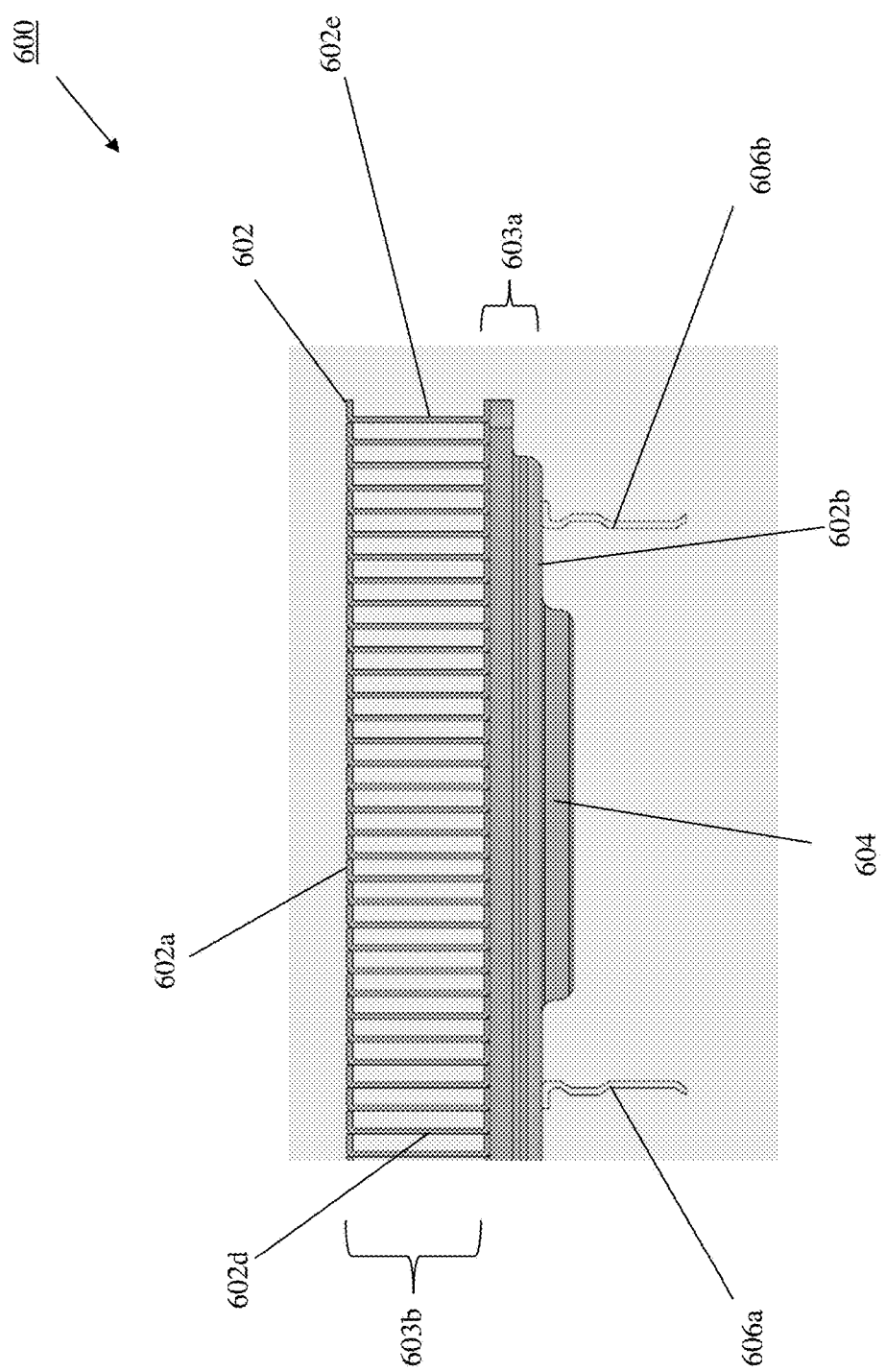
FIG. 6C is a side view illustrating an embodiment of the multiple transceiver heat dissipation device of FIG. 6A.

Now referring to FIGS. 6A, 6B, and 6C, an embodiment of a multiple transceiver heat dissipation device 600 is illustrated that may be used with the transceiver device 500 and communication system 400 of FIG. 4 (e.g., in networking device 202/300 discussed above). In the illustrated embodiment, the multiple transceiver heat dissipation device 600 includes a heat dissipation base 602 having a top surface 602a, bottom surface 602b that is located opposite the heat dissipation base 602 from the top surface 602a, a front surface 602c that extends between the top surface 602a and the bottom surface 602b, a rear surface 602d that is located opposite the heat dissipation base 602 from the front surface 602c and that extends between the top surface 602a and the bottom surface 602b, and a pair of opposing side surfaces 602e and 602f that are located opposite the heat dissipation base 602 from each other and that extend between top surface 602a, the bottom surface 602b, the front surface 602c, and the rear surface 602d.

As will be appreciated by one of skill in the art in possession of the present disclosure, the heat dissipation base 602 may include a heat distribution element 603a and a heat dissipation element 603b that may provide any of the top surface 602a, the front surface 602c, the rear surface 602d, and/or the side surfaces 602e and 602f. In a specific example, the heat dissipation base 602 on the multiple transceiver heat dissipation device 600 may be provided by a slim Vapor Chamber (VC) heat sink with a vapor chamber providing the heat distribution element 603a, and a "zipper" fin design heat dissipation element 603b, although one of skill in the art in possession of the present disclosure will appreciate how other heat dissipation structures will fall within the scope of the present disclosure as well.

As illustrated in FIGS. 6B and 6C, the multiple transceiver heat dissipation device 600 may include a plurality of transceiver device chassis engagement elements 604 that each extend from the bottom surface 602b of the heat dissipation base 602 adjacent the rear surface 602d and in a spaced apart orientation from each other. As discussed in further detail below, each of the transceiver device chassis engagement elements 604 are configured to engage a respective transceiver device chassis 404 when the multiple transceiver heat dissipation device 600 is positioned in a networking device. In a specific example, the transceiver device chassis engagement elements 604 may be provided by "pedestals" that extends a distance from the bottom surface 602b that allows them to engage the transceiver device chassis 404, although other techniques for engaging transceiver device chassis (e.g., thermal paste, etc.) will fall within the scope of the present disclosure as well.

In the illustrated embodiment, the multiple transceiver heat dissipation device 600 also includes a plurality of transceiver device chassis coupling element pairs 606a/606b that each extend from the bottom surface 602b of the heat dissipation base 602 on opposite sides of a respective transceiver device chassis engagement element 604, and that are each configured to couple to a respective transceiver device chassis 404 when the multiple transceiver heat dissipation device 600 is positioned in a networking device in order to ensure engagement of the transceiver device chassis engagement elements 604 and the plurality of transceiver device chassis 404. However, while specific examples of transceiver device chassis coupling elements 606a/606b have been illustrated and described (e.g., as being provided by a pair of opposing "clips"), one of skill in the art in possession of the present disclosure will appreciate how the multiple transceiver heat dissipation device 600 may be coupled to transceiver devices 500/transceiver device chassis 404 using other techniques that will fall within the scope of the present disclosure. Furthermore, while a specific multiple transceiver heat dissipation device 600 has been illustrated and described, one of skill in the art in possession of the present disclosure will appreciate how the multiple transceiver heat dissipation device of the present disclosure may include other components and/or component configurations while remaining within the scope of the present disclosure as well.

Referring now to FIG. 7, an embodiment of a method 700 for cooling transceiver devices is illustrated. As discussed below, the systems and methods of the present disclosure provide a multiple transceiver heat dissipation device that is configured to receive heat from multiple transceiver devices operating in a networking device and dissipate that heat. For example, the multiple transceiver cooling system of the present disclosure may include a networking device, a plurality of transceiver device chassis that are included in the networking device, that are positioned adjacent each other, and that are each configured to receive a respective transceiver device, and a multiple transceiver heat dissipation device that engages each of the plurality of transceiver device chassis. When the multiple transceiver heat dissipation device engages each of the plurality of transceiver device chassis, the multiple transceiver heat dissipation device may receive heat generated by respective transceiver devices located in the plurality of transceiver device chassis, transfer the heat to a heat dissipation element, and dissipate the heat using the heat dissipation element. As will be appreciated by one of skill in the art in possession of the present disclosure, the ability to receive heat generated by any of a plurality of transceiver devices by the multiple transceiver heat dissipation device of the present disclosure allows the multiple transceiver heat dissipation device to balance the thermal load generated by any one of those transceiver devices, while enhancing the cooling volume available to dissipate heat generated by any of those transceiver devices.

Figure 8A:
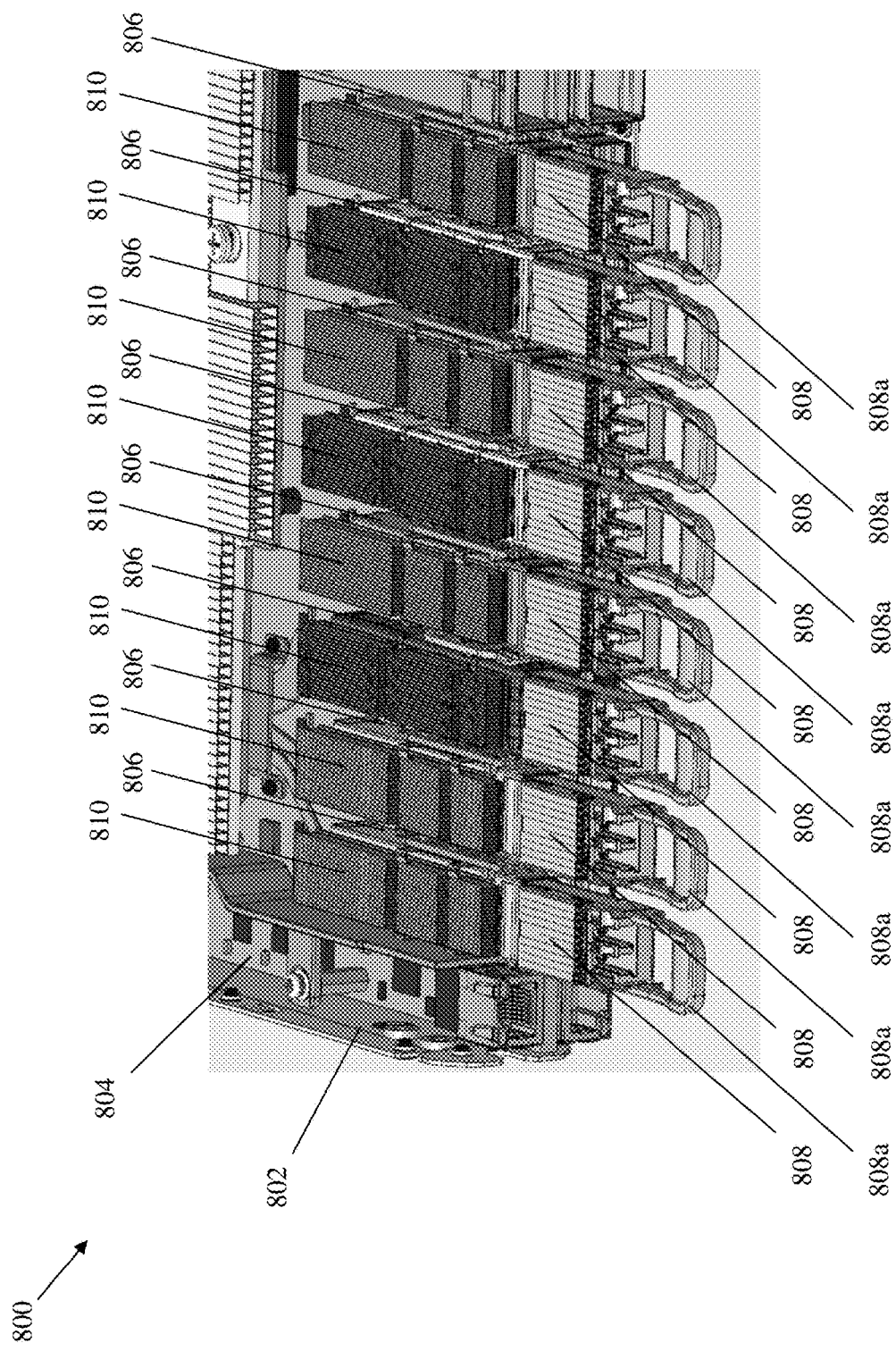
FIG. 8A is a perspective top view illustrating an embodiment of conventional transceiver device cooling systems.
Figure 8B:
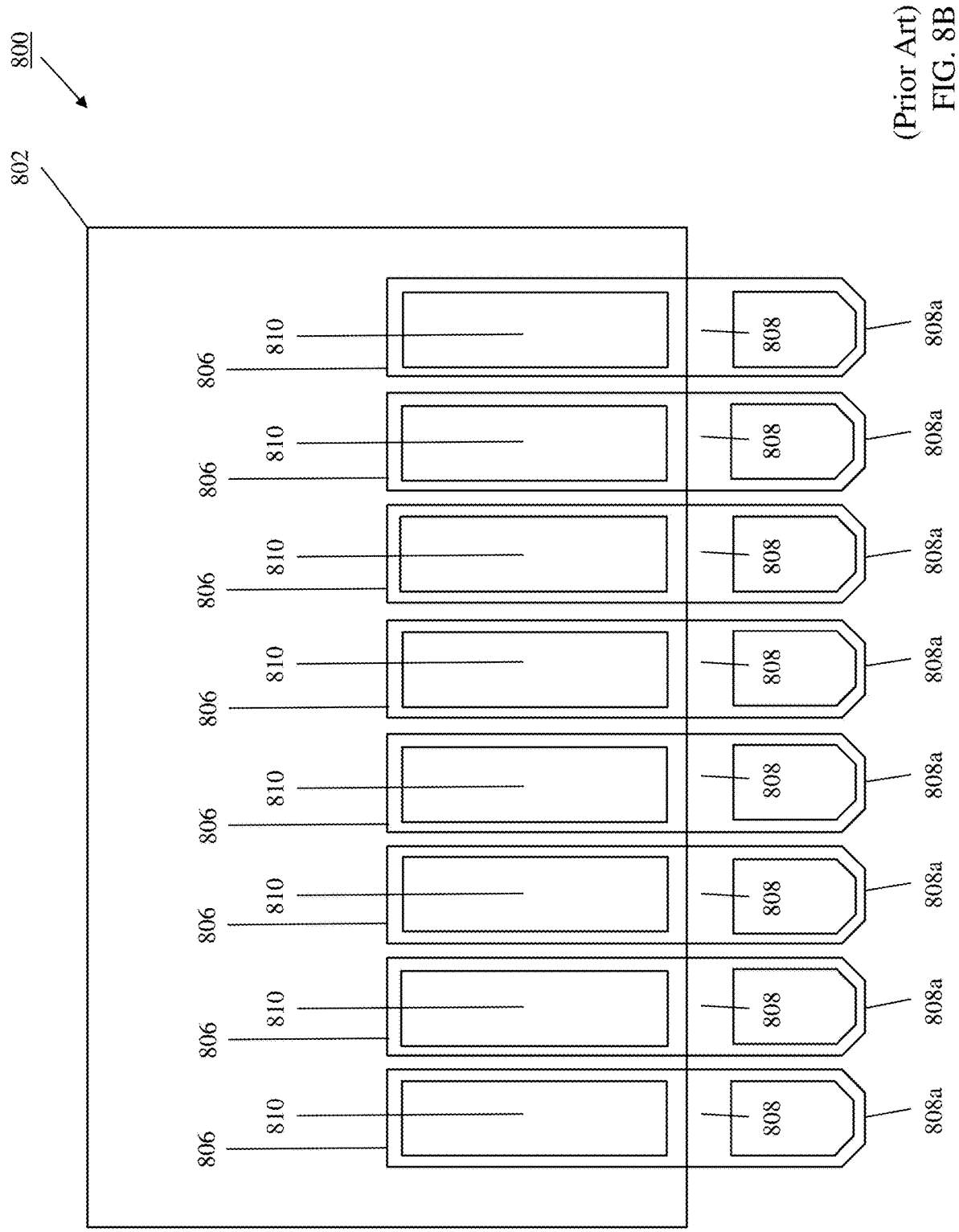
FIG. 8B is a schematic top view illustrating an embodiment of the conventional transceiver device cooling systems of FIG. 8A.

With reference to FIGS. 8A and 8B, an embodiment of conventional transceiver device cooling system 800 is illustrated that utilizes dedicated heat dissipation devices to cool each individual transceiver device. As can be seen in FIG. 8A, the conventional transceiver device cooling system 800 includes a device chassis 802 having a circuit board 804 mounted to the device chassis 804. In the illustrated embodiment, a plurality of transceiver device chassis 806 are mounted to the circuit board 804 and are configured to receive respective transceiver devices 808 each including a transceiver device handle 808a that may be utilized by a user to position the transceiver device 808 in the transceiver device chassis 806 similarly as discussed above. As discussed above, the conventional transceiver device cooling system 800 provides a respective dedicated heat dissipation device 810 that engages each respective transceiver device chassis 806, and that may be provided by a heat source riding heat sink kit (HSK).

As discussed above, the transmission of data by the transceiver devices 808 in the device chassis 802 may cause the transceiver devices 808 to generate relatively significant amounts of heat that require dissipation, and each dedicated heat dissipation device 810 in the conventional transceiver device cooling system 800 is used to dissipate the heat generated by the transceiver device 808 connected to the transceiver device chassis 806 which it engages. However, situations may arise where the heat generated by any of the transceiver devices 808 exceeds the ability of its dedicated heat dissipation device 810 to effectively dissipate the heat. In specific example, when any of the transceiver devices 808 are provided by a high power optical transceiver device or other transceiver devices capable of generating heat greater than 10 watts (and up to 25 watts in some conventional transceiver devices), the effective dissipation capabilities of their dedicated heat dissipation devices 810 may be exceeded, and such issues may be exacerbated in situations like that illustrated in FIG. 8A where the plurality of the transceiver devices 808 are positioned in the device chassis 802 in close proximity. As discussed below, the systems and methods of the present disclosure address such issues, at least in part, via a multiple transceiver heat dissipation device that is configured to receive and dissipate heat generated by any of a plurality of transceiver devices.

Figure 9A:
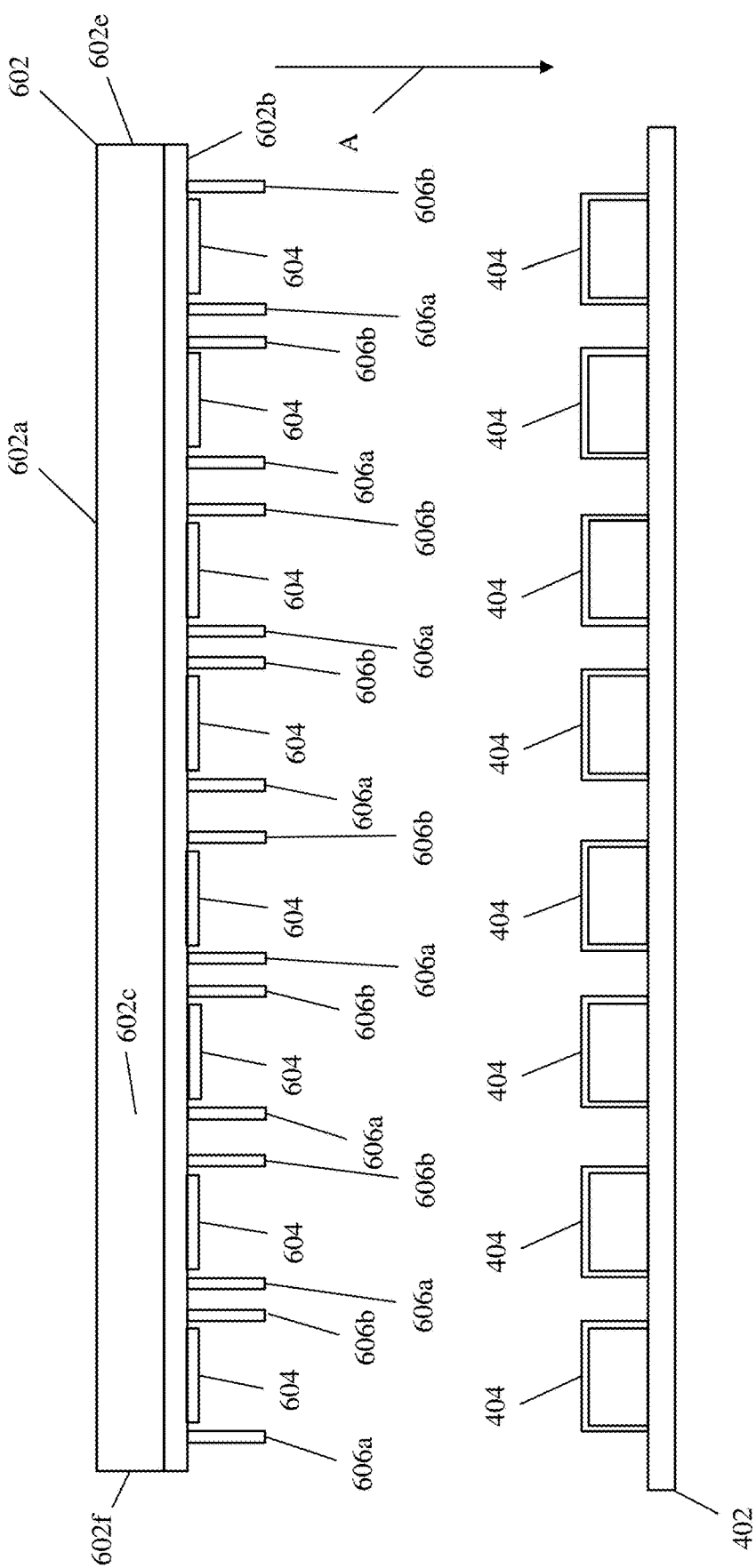
FIG. 9A is a schematic side view illustrating an embodiment of the multiple transceiver heat dissipation device of FIGS. 6A-6C being coupled to the communication system of FIG. 4 during the method of FIG. 7.

The method 700 begins at block 702 where a multiple transceiver heat dissipation device is engaged with a plurality of transceiver device chassis. With reference to FIG. 9A, in an embodiment of block 702, the multiple transceiver heat dissipation device 600 may be positioned adjacent the plurality of transceiver device chassis 404 that are mounted to the board 402 in the communication system 308/400 of the networking device 300. For example, the multiple transceiver heat dissipation device 600 may be positioned such that the bottom surface 602b of the heat dissipation base 602 faces the board 402 with each of the plurality of transceiver device chassis coupling element pairs 606a/606b aligned with a respective one of the plurality of respective transceiver device chassis 404.

Figure 9B:
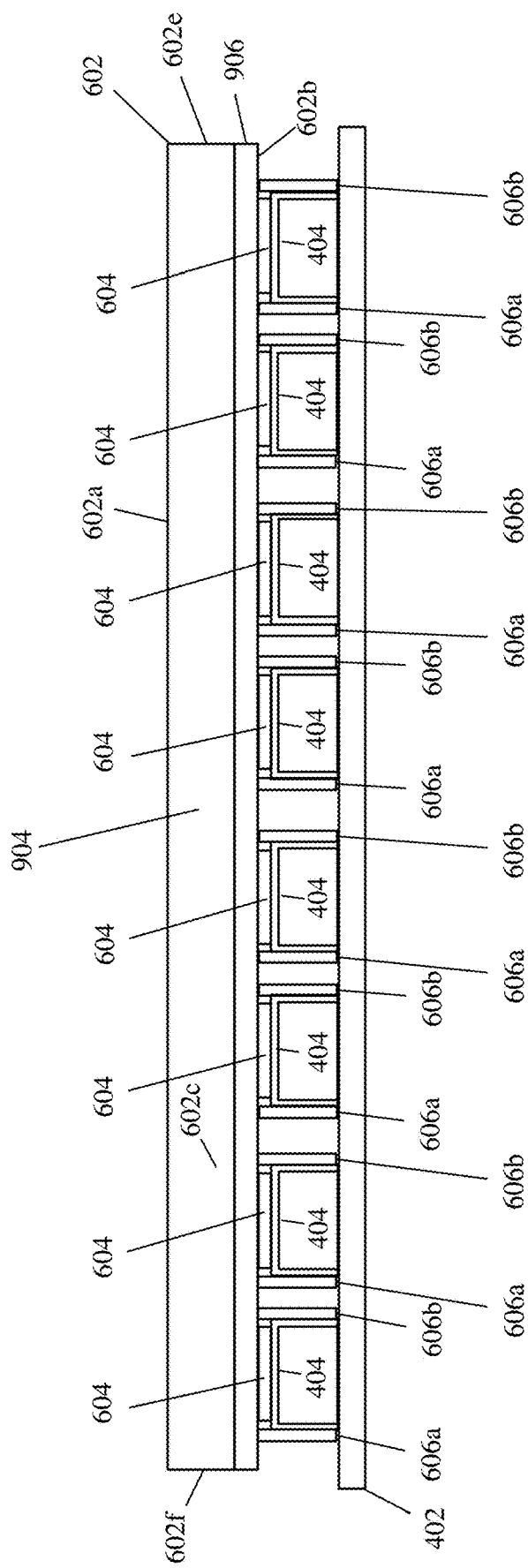
FIG. 9B is a schematic side view illustrating an embodiment of the multiple transceiver heat dissipation device of FIGS. 6A-6C coupled to the communication system of FIG. 4 during the method of FIG. 7 to provide the multiple transceiver cooling system for the present disclosure.

With reference to FIGS. 9A and 9B, the multiple transceiver heat dissipation device 600 may then be moved in a direction A such that each of the plurality of transceiver device chassis coupling element pairs 606a/606b engages with a respective one of the plurality of transceiver device chassis 404. For example, the movement of the multiple transceiver heat dissipation device 600 in the direction A may cause each of the plurality of transceiver device chassis coupling element pairs 606a/606b to come in contact with the respective one of the plurality of transceiver device chassis 404 such that the transceiver device chassis coupling elements 606a and 606b in that transceiver device chassis coupling element pair 606a/606b deflect away from each other and allow that respective transceiver device chassis 404 to move into a channel defined between those transceiver device chassis coupling elements 606a and 606b. As will be appreciated by one of skill in the art in possession of the present disclosure, each of the transceiver device chassis coupling elements 606a and 606b may engage the respective one of the plurality of transceiver device chassis 404 positioned between them to secure the multiple transceiver heat dissipation device 600 to the plurality of transceiver device chassis 404.

Furthermore, as can be seen in FIG. 9B, the movement of the multiple transceiver heat dissipation device 600 in the direction A causes each of the plurality of transceiver device chassis engagement elements 604 to come in contact with and/or otherwise engage a respective one of the plurality of transceiver device chassis 404. As discussed above, the transceiver device chassis engagement elements 604 may be provided by "pedestals" that extends a distance from the bottom surface 602b of the heat dissipation base 602 in order to allow them to engage the transceiver device chassis 404, and thus their configuration may change (or they may be omitted) based on the configuration of the communication system 400, the plurality of transceiver device chassis 404, the transceiver devices 500, and/or other features of the multiple transceiver cooling system. However, while a specific example of engaging the multiple transceiver heat dissipation device 600 with the plurality transceiver device chassis 404 has been described, one of skill in the art in possession of the present disclosure will appreciate how other techniques may be utilized to engage the multiple transceiver heat dissipation device 600 with the plurality of transceiver device chassis 404 (e.g., using a thermal paste, etc.) while remaining within the scope of the present disclosure as well.

Figure 9C:
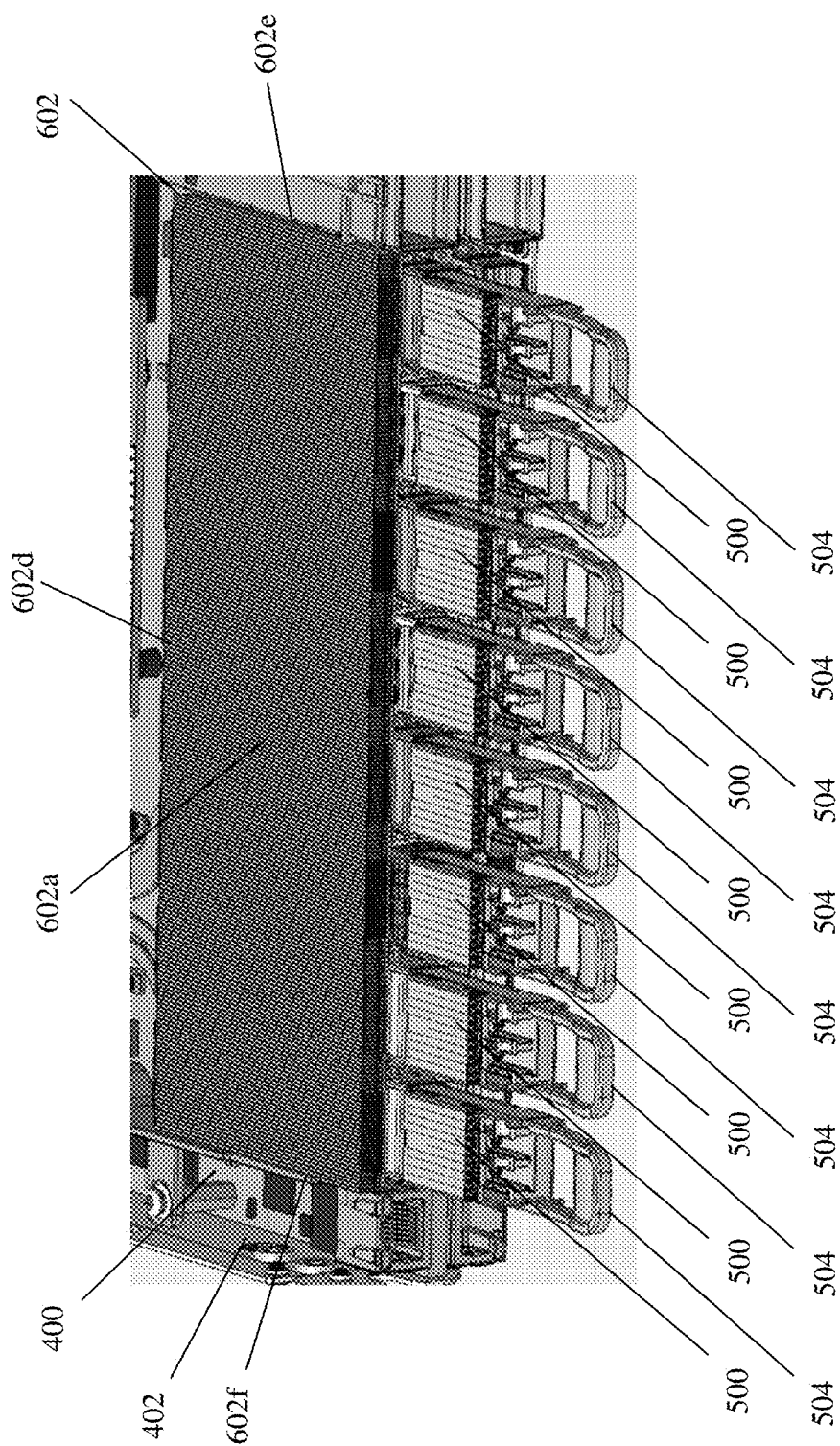
FIG. 9C is perspective top view illustrating an embodiment of a plurality of the transceiver devices of FIG. 5 coupled to the multiple transceiver cooling system of FIG. 9B during the method of FIG. 7.

The method 700 then proceeds to block 704 where the one or more transceiver devices are connected to a networking device via respective transceiver device chassis. With reference to FIGS. 9C and 9D, in an embodiment of block 704, transceiver devices 500 may be positioned in respective transceiver device chassis 404. For example, a user may grasp the transceiver device handle 504 of a transceiver device 500 and position the transceiver device 500 adjacent the transceiver device chassis 404, and then may move that transceiver device 500 towards the transceiver device chassis 404 such that that transceiver device 500 enters the transceiver device chassis 404 and the transceiver device connector 506 on that transceiver device 500 connects to a coupling system on the board 402 in order to, for example, enable the transmission of data via the board 402 and the transceiver device 500 by the networking engine 304. Furthermore, while the positioning of a single transceiver device 500 in a corresponding transceiver device chassis 404 has been described, as illustrated in FIGS. 9C and 9D, a transceiver device 500 may be positioned in any of the transceiver device chassis 404 while remaining within the scope of the present disclosure.

Furthermore, while the example of the method 700 discussed above describes the engagement of the multiple transceiver heat dissipation device 600 with the plurality of transceiver device chassis 404 at block 702 followed by the positioning of the transceiver devices 500 in those transceiver device chassis 404 at block 704, the transceiver devices 500 may be positioned in the transceiver device chassis 404 prior to the engagement of the multiple transceiver heat dissipation device 600 with the plurality of transceiver device chassis 404. As will be appreciated by one of skill in the art in possession of the present disclosure, in such embodiments, each of the transceiver device chassis engagement elements 604 (e.g., the "pedestals" that extend from the bottom surface 602b of the heat dissipation base 602) may engage a respective the transceiver device chassis 404 and/or a respective transceiver device 500 to thermally couple the multiple transceiver heat dissipation device 600 to the transceiver devices 500. Similarly as discussed above, the configuration of the transceiver device chassis engagement elements 604 may change (or they may be omitted) based on the configuration of the communication system 400, the plurality of transceiver device chassis 404, the transceiver devices 500, and/or other features of the multiple transceiver cooling system. However, while specific examples of thermally coupling the multiple transceiver heat dissipation device 600 with the plurality transceiver devices 500 have been described, one of skill in the art in possession of the present disclosure will appreciate how other techniques may be utilized to thermally couple the multiple transceiver heat dissipation device 600 with the plurality of transceiver devices 500 (e.g., using a thermal paste, etc.) while remaining within the scope of the present disclosure as well.

The method 700 then proceeds to block 706 where the one or more transceiver devices generate heat. In an embodiment of block 706 the networking engine 304 may transmit data using any of the transceiver devices 500 and, in response, those transceiver device(s) may generate heat. For example, the transceiver device 500 may receive data from the networking engine 304 via the board 402 and transmit that data to other device(s) connected to that transceiver 500, or the transceiver device 500 may receive data from other devices connected to that transceiver device 500 and transmit that data to the networking engine 304. As will be appreciated by one of skill in the art in possession of the present disclosure, the transmission of data as described above can cause the transceiver device 500 to generate a relatively high amount of heat (e.g. relatively high power optical transceiver devices can generate heat greater than 10 watts, and up to 25 watts in some cases), and that heat must to be dissipated in order to avoid failure of the transceiver device, data transmission errors, and/or other transceiver device heat issues that would be apparent to one of skill in the art in possession of the present disclosure.

Figure 10A:
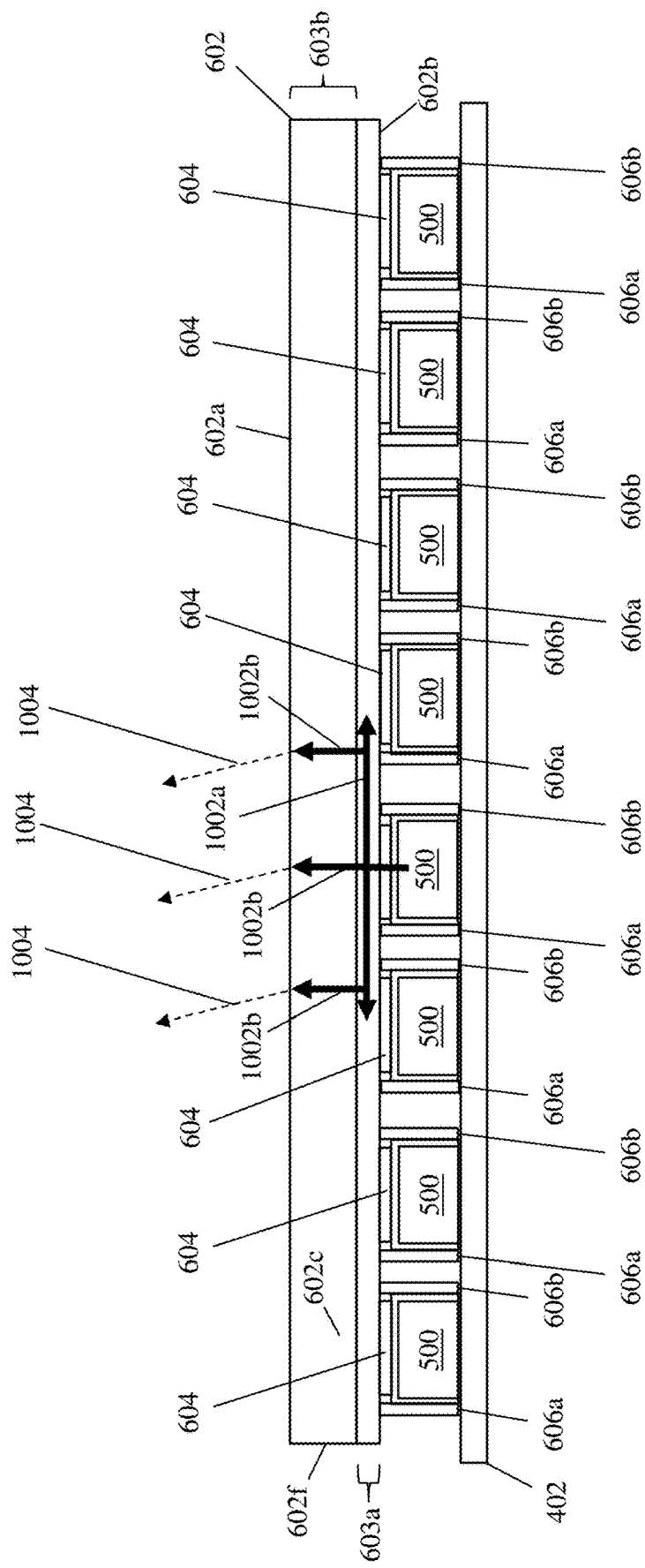
FIG. 10A is a schematic side view illustrating an embodiment of the operation of the multiple transceiver cooling system of FIGS. 9C and 9D during the method of FIG. 7.

The method 700 then proceeds to block 708 where the multiple transceiver heat dissipation device receives heat generated by the one or more transceiver devices and transfers that heat to a heat dissipation element. With reference to FIG. 10A, in an embodiment of block 708, heat generated by any of the transceiver devices 500 may be transferred from the transceiver device 500 to the multiple transceiver heat dissipation device 600, and while the heat transfer from a single transceiver device 500 is illustrated in FIG. 10A, one of skill in the art in possession of the present disclosure will appreciate how the other transceiver devices 500 illustrated in FIG. 10A may (or may not) transfer heat in a similar manner while remaining within the scope of the present disclosure. As illustrated in FIG. 10A, the heat generated by the transceiver device 500 may be transferred to the transceiver device chassis 404 via its engagement with the transceiver device 500. The multiple transceiver heat dissipation device 600 may then receive the heat transferred by the transceiver device 500 via the transceiver device chassis 404 at the transceiver device chassis engagement element 604, and transfer the heat received via transceiver device chassis engagement element 604 into the heat dissipation base 602 of the multiple transceiver heat dissipation device 600.

Figure 10B:
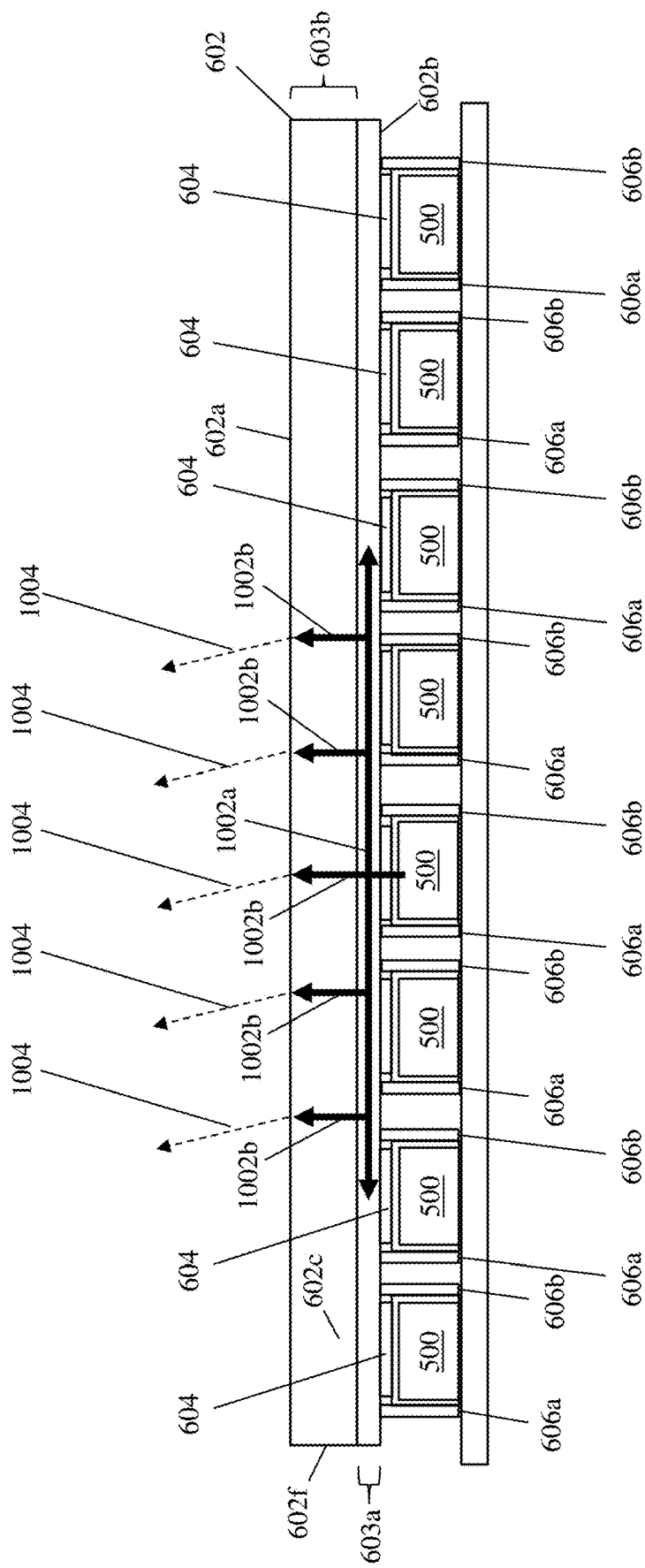
FIG. 10B is a schematic side view illustrating an embodiment of the operation of the multiple transceiver cooling system of FIGS. 9C and 9D during the method of FIG. 7.

The method 700 then proceeds to block 710 where the heat dissipation element distributes and dissipates the heat. With reference to FIGS. 10A and 10B, in an embodiment of block 710, the multiple transceiver heat dissipation device 600 may perform heat distribution operations 1002a that include distributing the heat received by the heat dissipation base 602 from the transceiver device 500. For example, as the heat is transferred to the heat distribution element 603a, the heat distribution element 603a may distribute the heat across the volume of the heat distribution element 603a. For example, a slim vapor chamber heat sink that provides the heat distribution element 603a may include a chamber that is filled with a metal (e.g., copper) powder/water mix or mesh structure and may be vacuum sealed such that it converts to vapor with the addition of heat, and one of skill in the art in possession of the present disclosure will appreciate how such a heat distribution element 603a may enable the heat dissipation operations illustrated in FIGS. 10A and 10B. However, while a specific technique for distributing heat across a heat dissipation element has been described, one of skill in the art in possession of the present disclosure will appreciate how other techniques may be utilized to distribute heat across a heat dissipation element while remaining within the scope of the present disclosure.

With continued reference to FIGS. 10A and 10B, an embodiment of block 710 may also include the multiple transceiver heat dissipation device 600 performing heat dissipation operations 1002b. For example, at block 710 the heat dissipation element 603b may dissipate the heat distributed by the heat distribution element 603a, which may include further distribution of the heat across the heat dissipation element 603b in order to allow heat radiation operations 1004 that include radiating that heat away from the multiple transceiver heat dissipation device 600. As such, the heat generated by the transceiver device 500 will be dissipated by the multiple transceiver heat dissipation device 600, and one of skill in the art in possession of the present disclosure will appreciate how the dissipation of heat may be enhanced by additional cooling systems (e.g., fans) included in the networking device 202/300.

Figure 10C:
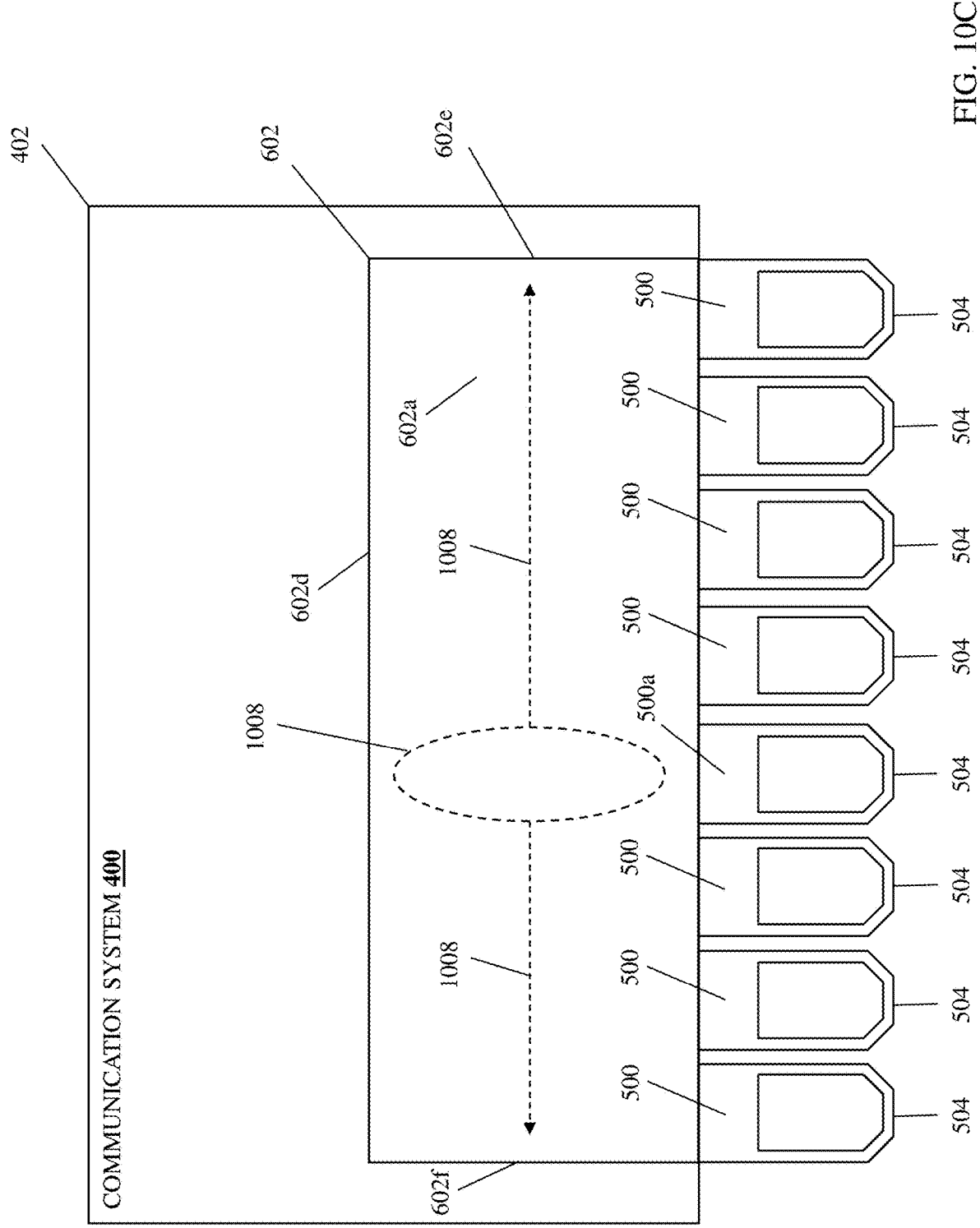
FIG. 10C is a schematic top view illustrating an embodiment of the operation of the multiple transceiver cooling system of FIGS. 9C and 9D during the method of FIG. 7.

With reference to FIG. 10C, a specific example of the performance of block 710 is illustrated in which a single transceiver device 500a may generate a relatively high amount of heat and/or may be generating relatively more heat than adjacent transceiver devices 500. As such, the transceiver device 500a may create a "thermal hot spot" 1008 or other region of relatively high temperatures in a volume of the multiple transceiver heat dissipation device 600. As can be seen in the embodiment illustrated in FIG. 10C, the multiple transceiver heat dissipation device 600 may perform the heat distribution and heat dissipation operations discussed above to balance the "thermal hot spot" 1008 by distributing the relatively higher heat produced by the transceiver device 500a from the volume of the heat dissipation base 602 immediately adjacent the transceiver device 500a to volumes on the heat dissipation base 602 that are immediately adjacent the other transceiver devices 500 (e.g., which may be generating relatively less heat).

As such, one of skill in the art in possession of the present disclosure will appreciate how the configuration of the multiple transceiver heat dissipation device 600 with the contiguous heat dissipation base 602, as opposed to the dedicated heat dissipation devices 810 of the conventional transceiver device cooling system 800 of FIGS. 8A and 8B, allows the distribution of the "thermal hot spot" 1008 to volumes of the heat dissipation base 602 that are immediately adjacent other transceiver devices that may be generating relatively less heat, and benefits thermal control in the networking device 200 by, for example, saving power on other cooling systems (e.g. fan cooling systems, water cooling system, etc.). As such, while referred to as a "multiple" transceiver heat dissipation device 600 in a "multiple" transceiver cooling system, one of skill in the art in possession of the present disclosure will recognize how the use of the multiple transceiver heat dissipation device 600/multiple transceiver cooling system with a single transceiver device (e.g., when that transceiver device is positioned in a transceiver device chassis 404 in the communication system 400 and the adjacent transceiver device chassis 404 do not include transceiver devices) will provide the benefits discussed above as well.

Figure 11:
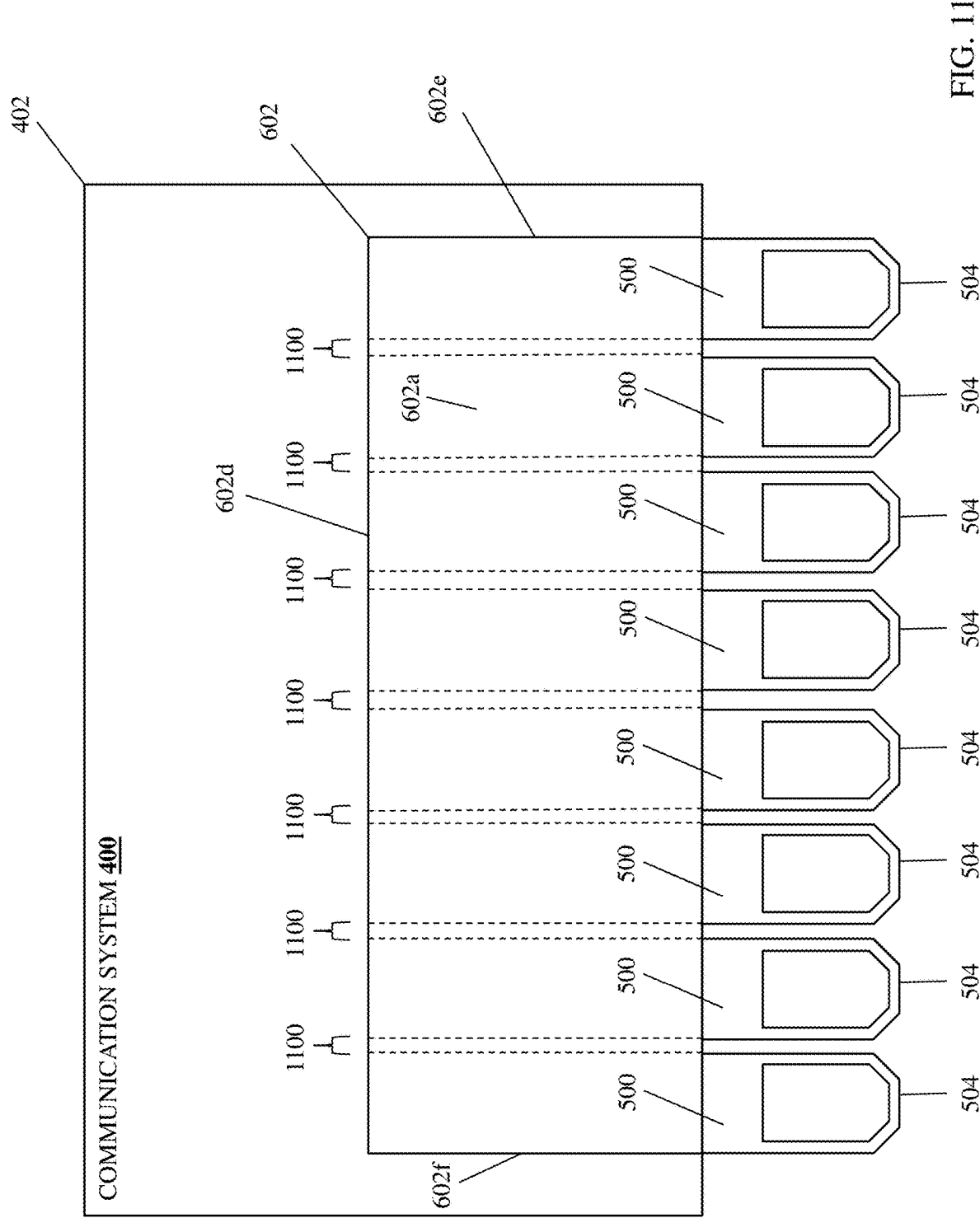
FIG. 11 is a schematic top view illustrating an embodiment of the benefits of the multiple transceiver cooling system of FIGS. 10A-10C relative to the conventional transceiver device cooling system of FIGS. 8A and 8B.

With reference to FIG. 11, the benefits of the multiple transceiver cooling system of the present disclosure relative to the conventional transceiver device cooling system 800 of FIGS. 8A and 8B is illustrated. As can be seen in FIG. 11, the heat dissipation base 602 that engages each of the respective transceiver device chassis 404 and extends between those transceiver device chassis 404 provides an additional cooling volume, relative to the cooling volume provided by the conventional transceiver device cooling system 800, that is the sum of a plurality of additional cooling sub-volumes 1100 of the heat dissipation base 602 that are each positioned adjacent a respective space between any two adjacent transceiver device chassis 404.

With reference to FIG. 12, in an experimental embodiment, the cooling volume 1200 of the multiple transceiver heat dissipation device 600 was measured relative to the cooling volume 1202 of a conventional transceiver device cooling system 800 (i.e., with the conventional transceiver device cooling system 800 including all of its transceiver device chassis having transceiver devices, and each transceiver device being provided with a respective dedicated heat dissipation device), and was found to provide an increased cooling volume 1200*a* of approximately 23%. Similarly as discussed above, the increased cooling volume 1200*a* provided by the multiple transceiver heat dissipation device 600 may save costs associated with the need to provide other cooling devices (e.g., fans) and/or to power cooling devices, and/or may allow transceiver devices to operate at higher performance levels and/or for longer periods of time, as well as provide other benefits that would be apparent to one of skill in the art in possession of the present disclosure Thus, systems and methods have been described that provide for a transceiver heat dissipation device that is configured to receive heat from multiple transceiver devices operating in a networking device and dissipate that heat. For example, the multiple transceiver cooling system of the present disclosure may include a networking device, a plurality of transceiver device chassis that are included in the networking device, that are positioned adjacent each other, and that are each configured to receive a respective transceiver device, and a multiple transceiver heat dissipation device that engages each of the plurality of transceiver device chassis. When the multiple transceiver heat dissipation device engages each of the plurality of transceiver device chassis, the multiple transceiver heat dissipation device may receive heat generated by respective transceiver devices located in the plurality of transceiver device chassis, transfer the heat to a heat dissipation element, and dissipate the heat using the heat dissipation element. As will be appreciated by one of skill in the art in possession of the present disclosure, the engagement of multiple transceiver devices by the multiple transceiver heat dissipation device of the present disclosure allows the multiple transceiver heat dissipation device to balance the thermal load generated by any one of the transceiver devices, while enhancing the cooling volume available to dissipate heat generated by any of those transceiver devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multiple transceiver cooling system, comprising:
   a networking device;
   a plurality of transceiver device chassis that are included in the networking device adjacent respective transceiver device connectors, that are positioned adjacent to and spaced apart from each other in a transceiver device chassis row, and that are each configured to receive a respective transceiver device to connect that respective transceiver device to the respective transceiver device connector adjacent that transceiver device chassis to configure that respective transceiver device to transmit data with the networking device; and
   a multiple transceiver heat dissipation device in the networking device that includes a heat distribution element that engages an outer surface of each of the plurality of transceiver device chassis in the transceiver device chassis row, and a heat dissipation element that extends from the heat distribution element immediately opposite the heat distribution element from each of the plurality of transceiver device chassis in the transceiver device chassis row, wherein the multiple transceiver heat dissipation device is configured to:
   receive, via the heat distribution element, heat generated by the respective transceiver devices that are located in the plurality of transceiver device chassis in the transceiver device chassis row;
   transfer, via the heat distribution element, the heat to the heat dissipation element that is located immediately opposite the heat distribution element from the plurality of transceiver device chassis in the transceiver device chassis row; and
   dissipate, using the heat dissipation element, the heat.

2. The system of claim 1, wherein the multiple transceiver heat dissipation device includes a slim vapor chamber heat sink.

3. The system of claim 1, wherein the multiple transceiver heat dissipation device includes a plurality of transceiver device chassis coupling elements that are each configured to couple to a respective transceiver device chassis in the transceiver device chassis row.

4. The system of claim 1, wherein the heat distribution element includes a plurality of transceiver device chassis engagement elements that each extend from the heat distribution element to engage a respective transceiver device chassis in the transceiver device chassis row.

5. The system of claim 1, wherein the multiple transceiver heat dissipation device includes a first heat dissipation section that is located immediately adjacent a first transceiver device chassis included in the plurality of transceiver device chassis, and a second heat dissipation section that is located immediately adjacent a second transceiver device chassis included in the plurality of transceiver device chassis, and wherein the heat dissipation element is configured to:
   distribute, to the second heat dissipation section, heat that was generated by a first transceiver device located in the first transceiver device chassis and transferred to the first heat dissipation section.

6. The system of claim 5, wherein the multiple transceiver heat dissipation device includes a third heat dissipation section that is located immediately adjacent a third transceiver device chassis included in the plurality of transceiver device chassis, and wherein the heat dissipation element is configured to:
   distribute, to the third heat dissipation section, the heat that was generated by the first transceiver device located in the first transceiver device chassis, transferred to the first heat dissipation section, and distributed to the second heat dissipation section.

7. An Information Handling System (IHS), comprising:
   a processing system; and
   a memory system that is coupled to the processing system and that includes instructions that, when executed by the processing system, cause the processing system to provide a networking engine that is configured to perform networking functionality;
   a plurality of transceiver device chassis that are positioned adjacent to and spaced apart from each other in a transceiver device chassis row and that are located adjacent respective transceiver device connectors that are coupled to the processing system;
   a plurality of transceiver devices that are each positioned in a respective one of the plurality of transceiver device chassis and connected to the respective transceiver device connector adjacent that transceiver device chassis to couple that transceiver device to the processing system; and a multiple transceiver heat dissipation device that includes a heat distribution element that is thermally coupled to each of the plurality of transceiver devices via engagement with an outer surface of the plurality of transceiver device chassis in the transceiver device chassis row, and a heat dissipation element that extends from the heat distribution element immediately opposite the heat distribution element from each of the plurality of transceiver device chassis in the transceiver device chassis row, wherein the multiple transceiver heat dissipation device is configured to:

receive, via the heat distribution element, heat generated by each of the plurality of transceiver devices;

transfer, via the heat distribution element, the heat to the heat dissipation element that is located immediately opposite the heat distribution element from the plurality of transceiver device chassis in the transceiver device chassis row; and dissipate, using the heat dissipation element, the heat.

8. The IHS of claim 7, wherein the multiple transceiver heat dissipation device includes a slim vapor chamber heat sink.

9. The IHS of claim 7, wherein the multiple transceiver heat dissipation device includes a plurality of transceiver device coupling elements that are each configured to couple to a respective transceiver device chassis included in the plurality of transceiver device chassis in the transceiver device chassis row.

10. The IHS of claim 7, wherein the heat distribution element includes a plurality of transceiver device engagement elements that each extend from the heat distribution element to engage a respective transceiver device chassis included in the plurality of transceiver device chassis in the transceiver device chassis row.

11. The IHS of claim 7, wherein the multiple transceiver heat dissipation device includes a first heat dissipation section that is located immediately adjacent a first transceiver device included in the plurality of transceiver devices, and a second heat dissipation section that is located immediately adjacent a second transceiver device included in the plurality of transceiver devices, and wherein the heat dissipation element is configured to:

distribute, to the second heat dissipation section, heat that was generated by a first transceiver device and transferred to the first heat dissipation section.

12. The IHS of claim 11, wherein the multiple transceiver heat dissipation device includes a third heat dissipation section that is located immediately adjacent a third transceiver device included in the plurality of transceiver devices, and wherein the heat dissipation element is configured to:

distribute, to the third heat dissipation section, the heat that was generated by the first transceiver device, transferred to the first heat dissipation section, and distributed to the second heat dissipation section.

13. The IHS of claim 7, wherein the plurality of transceiver devices include at least one first transceiver device that is configured to generate a first maximum amount of heat, and at least one second transceiver device that is configured to generate a second maximum amount of heat that is less than the first maximum amount of heat.

14. A method for cooling multiple transceiver devices in a networking device, comprising:

receiving, by a multiple transceiver heat dissipation device using heat distribution element on the multiple transceiver heat dissipation device that is thermally coupled to each of a plurality of transceiver devices via engagement with an outer surface of a plurality of transceiver device chassis that are positioned adjacent to and spaced apart from each other in a transceiver device chassis row and that house the plurality of transceiver devices, heat generated by each of the plurality of transceiver devices in response to each of the plurality of transceiver devices transmitting data with a networking device to which they are connected via a respective transceiver device connector that is located adjacent the transceiver device chassis that houses that transceiver device;

transferring, by the multiple transceiver heat dissipation device using the heat distribution element, the heat to a heat dissipation element on the multiple transceiver heat dissipation device that extends from the heat distribution element immediately opposite the heat distribution element from each of the plurality of transceiver device chassis in the transceiver device chassis row; and dissipating, by the multiple transceiver heat dissipation device using the heat dissipation element, the heat.

15. The method of claim 14, wherein the multiple transceiver heat dissipation device includes a slim vapor chamber heat sink.

16. The method of claim 14, further comprising:

coupling, by each of a plurality of transceiver device chassis coupling elements that are included on the multiple transceiver heat dissipation device, to a respective transceiver device chassis included in the plurality of transceiver device chassis in the transceiver device chassis row.

17. The method of claim 14, further comprising:

thermally coupling, by each of a plurality of transceiver device chassis engagement elements that each extend from the heat distribution element, the multiple transceiver heat dissipation device to a respective transceiver device chassis included in the plurality of transceiver device chassis in the transceiver device chassis row.

18. The method of claim 14, wherein the multiple transceiver heat dissipation device includes a first heat dissipation section that is located immediately adjacent a first transceiver device included in the plurality of transceiver device, and a second heat dissipation section that is located immediately adjacent a second transceiver device included in the plurality of transceiver device, and wherein the method further comprises:

distributing, by the heat dissipation element to the second heat dissipation section, heat that was generated by the first transceiver device and transferred to the first heat dissipation section.

19. The method of claim 14, wherein the multiple transceiver heat dissipation device includes a third heat dissipation section that is located immediately adjacent a third transceiver device chassis included in the plurality of transceiver device chassis, and wherein the method further comprises:

distributing, by the heat dissipation element to the third heat dissipation section, the heat that was generated by the first transceiver device, transferred to the first heat dissipation section, and distributed to the second heat dissipation section.

20. The method of claim 14, further comprising:
generating, by at least one first transceiver device that is included in the plurality of transceiver devices, a first maximum amount of heat; and
generating, by at least one second transceiver device that is included in the plurality of transceiver devices, a second maximum amount of heat that is less than the first maximum amount of heat.

\* \* \* \* \*